US012371292B2

(12) United States Patent
Sato

(10) Patent No.: US 12,371,292 B2
(45) Date of Patent: Jul. 29, 2025

(54) POST-PROCESSING APPARATUS, IMAGE FORMING APPARATUS, AND ROTATION PADDLE

(71) Applicant: KONICA MINOLTA, INC., Tokyo (JP)

(72) Inventor: Ryuji Sato, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 246 days.

(21) Appl. No.: 18/212,686

(22) Filed: Jun. 21, 2023

(65) Prior Publication Data

US 2024/0017953 A1 Jan. 18, 2024

(30) Foreign Application Priority Data

Jul. 13, 2022 (JP) ................................ 2022-112528

(51) Int. Cl.

*B65H 29/22* (2006.01)
*B41J 11/00* (2006.01)
*B65H 31/02* (2006.01)
*G03G 15/00* (2006.01)

(52) U.S. Cl.

CPC ............ *B65H 29/22* (2013.01); *B41J 11/007* (2013.01); *B65H 31/02* (2013.01); *G03G 15/6529* (2013.01); *B65H 2301/421* (2013.01); *B65H 2404/653* (2013.01); *B65H 2408/1142* (2013.01); *B65H 2408/12* (2013.01)

(58) Field of Classification Search

CPC ................................ B65H 29/22; B65H 31/02

See application file for complete search history.

(56) References Cited

U.S. PATENT DOCUMENTS 8,794,617 B2 * 8/2014 Tokuma ................ B65H 33/08 270/58.12
10,233,048 B2 * 3/2019 Noso ...................... B65H 31/02
10,479,636 B2 * 11/2019 Nakano ................. B65H 29/20

FOREIGN PATENT DOCUMENTS

JP 6672732 B2 3/2020

* cited by examiner

*Primary Examiner* — Sharon Polk

(74) *Attorney, Agent, or Firm* — Squire Patton Boggs (US) LLP

(57) ABSTRACT

A post-processing apparatus that rotates a rotation paddle in which a fin having flexibility is cantilevered by a holder to apply a conveying force along a rotation direction to a sheet to align the sheet, wherein the holder includes a recess in which a peripheral surface part from a support position of the fin to an upstream side in the rotation direction is recessed from a circumscribed circle of the holder, and when the fin elastically turns while being pressed against the sheet with rotation of the rotation paddle, turning of the fin is allowed until the fin comes into contact with a surface of the recess.

19 Claims, 17 Drawing Sheets

POST-PROCESSING APPARATUS, IMAGE FORMING APPARATUS, AND ROTATION PADDLE

The entire disclosure of Japanese patent Application No. 2022-112528, filed on Jul. 13, 2022, is incorporated herein by reference in its entirety.

BACKGROUND

Technological Field

The present disclosure relates to a post-processing apparatus, an image forming apparatus, and a rotation paddle that align sheets stored on a tray with the rotation paddle.

Description of the Related Art

In the field of image forming apparatuses such as printers, a post-processing apparatus has been developed in which sheets after image formation are stacked and stored one by one on a post-processing tray to be aligned, and post-processing such as staple binding and punching holes is performed on a sheet bundle after alignment (for example, JP 6672732 B2).

FIG. 17 is a schematic view of a sheet alignment part 910 in a conventional post-processing apparatus 900, and an image forming apparatus (not illustrated) is disposed on the right side of the post-processing apparatus 900.

As illustrated in the drawing, when the post-processing apparatus 900 receives a sheet S discharged from a sheet discharge part of the image forming apparatus through a receiving port 908, the sheet S is conveyed by a conveyance roller pair 907 in the direction of the arrow A1.

The sheet alignment part 910 disposed below the conveyance roller pair 907 includes a tray 901 inclined such that the right end is lower than the left end and a rotation paddle 902 disposed above the tray. The rotation paddle 902 is formed by cantilever supporting a flexible fin 921 having elasticity such as rubber by a holder 920.

The sheet S that has passed through the conveyance roller pair 907 is conveyed along the direction of the arrow A2 indicated by a broken line and then falls to the left end side on the tray 901.

The sheet S that has fallen onto the tray 901 slides down on the tray 901 in the direction of the arrow A3 by gravity along the inclination of the tray 901 and comes into contact with a tip end part 922 of the fin 921 of the rotation paddle 902 that rotates in the direction of the arrow Q. When the tip end part 922 of the fin 921 comes into contact with the upper surface of the sheet S on the tray 901, the fin 921 is bent to generate elastic force. Of the elastic force, a component perpendicular to the upper surface of the sheet S is a normal force, a frictional force acts between the tip end part 922 of the fin 921 and the upper surface of the sheet S, and a conveying force along the rotation direction is applied to the sheet S. As a result, a tip end Sf of the sheet S abuts against the end guide 903 at the right end of the tray 901.

The abutting operation of the sheet S against the end guide 903 is repeatedly performed every time one sheet S is conveyed onto the tray 901, and each sheet S stacked and stored on the tray 901 is aligned with the end guide as a reference position (alignment).

The aligned sheet bundle is subjected to post-processing of staple binding by a post-processing part 905, for example, a staple binding unit, and then conveyed on the tray 901 in the direction of the arrow A4 by a conveying means (not illustrated), discharged from a sheet discharge port 909, and then stored on a sheet discharge tray (not illustrated).

It has been proposed that such a post-processing apparatus is attached in an in-body space in a so-called in-body sheet discharge type image forming apparatus having an in-body space between, for example, an image reading part and an image forming part positioned below the image reading part.

In the in-body sheet discharge type image forming apparatus, the in-body space is not so wide, and in particular, the storage space in the vertical direction is often narrow. In order to attach the post-processing apparatus in a narrow storage space, it is necessary to further downsize the post-processing apparatus in the vertical direction.

As one of methods for achieving downsizing, it is conceivable to narrow the interval between the conveyance roller pair 907 and the tray 901 and to further narrow the interval J between the holder 920 of the rotation paddle 902 and the tray 901. However, when the interval J is to be narrowed, the following problem occurs. A specific description will be given below with reference to FIG. 18.

FIG. 18 is a schematic view illustrating an example of a state in which one fin 921 cantilevered by the holder 920 is bent in contact with the upper surface of the sheet S on the tray 901. Here, the fin 921 indicated by a broken line has a configuration in which the interval J between the holder 920 and the tray 901 is Ja of the related art, and the fin 921 indicated by a solid line has a configuration in which Jb is narrower than Ja.

As illustrated in the drawing, when the length of the fin 921 does not change but the interval J is narrowed, the deflection amount of the fin 921 increases, that is, the bending becomes tight.

Until the rotation paddle 902 rotates in the direction of the arrow Q and the tip end part of the fin 921 is separated from the sheet S, the fin 921 indicated by the solid line is bent more tightly than the fin 921 indicated by the broken line, so that the elastic energy accumulated in the fin 921 also increases.

Then, when the tip end part of the fin 921 is separated from the sheet S, at that moment, the fin 921 transitions to jump up from the posture indicated by the one-dot chain line to the posture indicated by the two-dot chain line along with the release of the large elastic energy accumulated so far, and the force applied from the fin 921 to the sheet S considerably increases. As this force increases, the force to push out the sheet S in the conveyance direction (the direction of the arrow A3) increases.

If the pushing force becomes too strong, the tip end part is bent at the moment when the tip end Sf of the sheet S comes into contact with the end guide 903, and the sheet S returns in the direction of the arrow A6 opposite to the conveyance direction with respect to the end guide 903 due to the reaction when the bent tip end part tries to return to the original straight posture, and there is a possibility that the sheet S is separated from the end guide 90.

In addition, when a strong pushing force is applied to the sheet S from the fins 921 in a state where the tip end Sf of the sheet S is in contact with the end guide 903, the sheet S is pushed from the rear end side toward the end guide 903, and there is a possibility that buckling occurs in which the sheet S is folded in an upward convex mountain shape at the central part in the conveyance direction. Such separation of the sheet S from the end guide and buckling of the sheet S lead to deterioration of alignment.

In order to narrow the interval J, it is also conceivable to make the length of the fin 921 shorter. However, as the length of the fin 921 is shortened, the length from the rotation shaft of the holder 920 to the tip end of the fin 921, that is, the rotation radius is shortened. Therefore, the time from when the tip end of the fin 921 comes into contact with the sheet S to when the tip is separated from the sheet S is shortened, and the conveying force of the sheet S is reduced.

In the above description, the example in which the post-processing apparatus is applied to the in-body discharge type image forming apparatus has been described, but the present invention is not limited to the in-body discharge type. For example, in a case where the apparatus is downsized by narrowing the interval J, the same problem as described above may occur.

SUMMARY

The present disclosure has been made in view of the above problems, and an object of the present disclosure is to provide a post-processing apparatus, an image forming apparatus, and a rotation paddle that can improve the alignment of sheets while achieving downsizing even when a fin having a length similar to a conventional length is used in a configuration using the rotation paddle in which the fin is cantilevered by a holder.

To achieve the abovementioned object, according to an aspect of the present invention, there is provided a post-processing apparatus that rotates a rotation paddle in which a fin having flexibility is cantilevered by a holder to apply a conveying force along a rotation direction to a sheet to align the sheet, reflecting one aspect of the present invention, wherein the holder includes a recess in which a peripheral surface part from a support position of the fin to an upstream side in the rotation direction is recessed from a circumscribed circle of the holder, and when the fin elastically turns while being pressed against the sheet with rotation of the rotation paddle, turning of the fin is allowed until the fin comes into contact with a surface of the recess.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of a post-processing apparatus, an image forming apparatus, and a rotation paddle of the present invention will be described with reference to the drawings. However, the scope of the invention is not limited to the disclosed embodiments.

<Configuration of Image Forming Apparatus 1>

Figure 1:
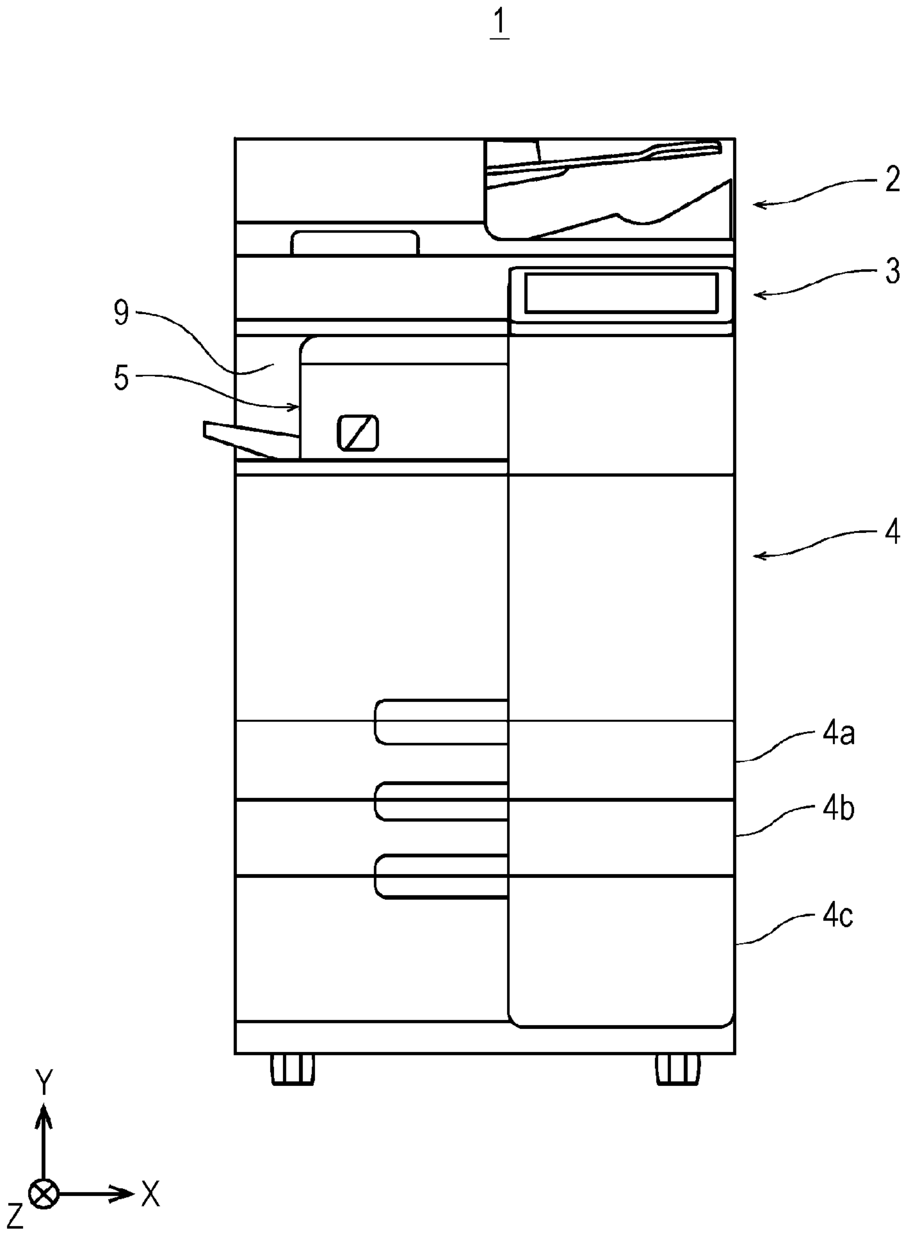
FIG. 1 is a front view illustrating an overall configuration of an image forming apparatus.

FIG. 1 is a front view illustrating an overall configuration of an image forming apparatus 1. In the drawing, a left-right direction when the image forming apparatus 1 is viewed from the front surface side is referred to as an X-axis direction, a vertical direction is referred to as a Y-axis direction, and a depth (apparatus front-rear) direction orthogonal to both the X-axis and the Y-axis is referred to as a Z-axis direction. In addition, the back side with respect to the front surface of the apparatus is referred to as an apparatus back surface side.

The image forming apparatus 1 includes a scanner part 2 (image reading part), an operation part 3, a printer part 4 (image forming part), and a post-processing part 5. The image forming apparatus 1 is an in-body sheet discharge type in which the printer part 4 is disposed below the scanner part 2 with an in-body space 9 having an opening on the apparatus front surface side therebetween. The post-processing part 5 is accommodated in the in-body space 9.

The image forming apparatus 1 is a multi-function peripheral (MFP) having functions of a scanner, a printer, a copier, and the like, and executes various jobs such as a scan job for reading an image of a document, a copy job for printing a document image on a sheet on the basis of image data obtained by reading, and a print job for receiving a job request from an external terminal (not illustrated) connected via a network and printing an image related to the received job on a sheet.

The scanner part 2 conveys a set document and reads an image of the document to obtain image data.

The printer part 4 forms (prints) an image on a sheet based on image data obtained by the scanner part 2 or data of a print job from an external terminal. As a method of image formation, for example, an electrophotographic method or an inkjet method is used, but the method is not particularly limited.

At the time of image formation, the printer part 4 feeds sheets one by one from any of cassettes 4*a*, 4*b*, and 4*c* disposed at the lowermost position, forms an image for each sheet while conveying the fed sheets one by one upward along the conveyance path, and conveys the sheet on which the image is formed to a discharge roller pair 40 (FIG. 2) to discharge the sheet from the outside of the apparatus. The discharged sheet is carried into the post-processing part 5.

The operation part 3 is disposed at a position where it is easy for the user to operate when standing in front of the image forming apparatus 1. The operation part 3 receives an input operation of the user, for example, input of the number of copies, a job start instruction such as copying, a job stop instruction, post-processing in the post-processing part 5, here, an execution instruction of staple binding of a sheet bundle, designation of the number of copies, and the like, and transmits the received contents to a control part (not illustrated).

The control part receives input information of the user from the operation part 3, and controls the scanner part 2 and the printer part 4 to smoothly execute a job according to an instruction of the user. In addition, when the execution of the post-processing is instructed, the instruction is transmitted to the post-processing part 5, and the instructed post-processing is executed.

<Configuration of Post-processing Part 5>

Figure 2:
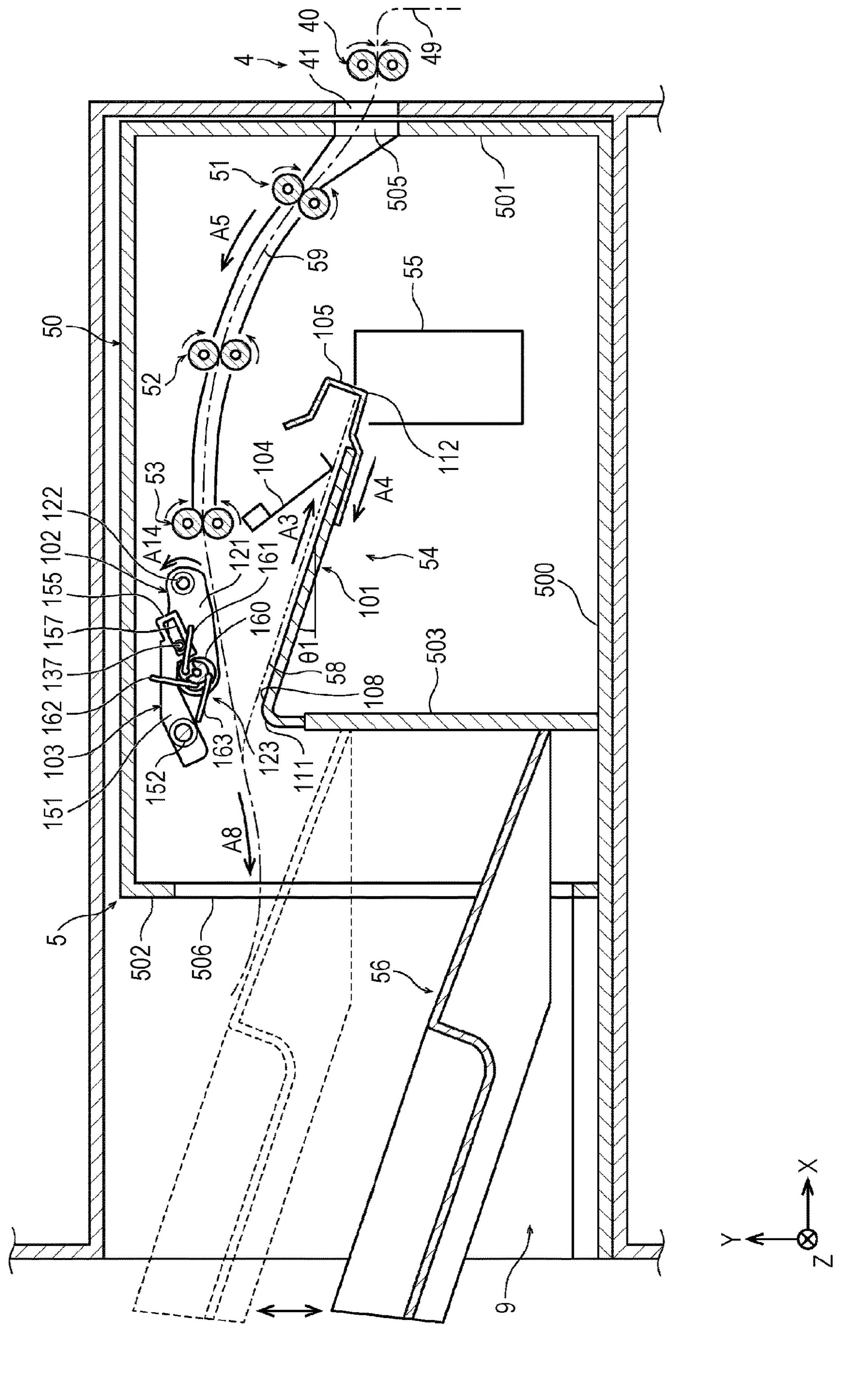
FIG. 2 is a schematic front cross-sectional view illustrating an overall configuration of a post-processing part.

FIG. 2 is a schematic front cross-sectional view illustrating the overall configuration of the post-processing part 5, and also illustrates a discharge roller pair 40, a discharge port 41, and a conveyance path 49 of the printer part 4.

As illustrated in the drawing, the post-processing part 5 includes a housing 50, conveyance roller pairs 51, 52, and 53, a sheet alignment part 54, a staple binding part 55, and a sheet discharge tray 56. The conveyance roller pairs 51, 52, and 53, the sheet alignment part 54, and the staple binding part 55 are accommodated in the housing 50.

A receiving port 505 for receiving the sheet discharged by the discharge roller pair 40 from the discharge port 41 of the printer part 4 is provided on a right side wall 501 of the housing 50. An opening 506 for securing a movement space for the vertically moving sheet discharge tray 56 is provided on a left side wall 502 of the housing 50.

The conveyance roller pairs 51 to 53 convey the sheet received from the receiving port 505 in the direction of the arrow A5 along a conveyance path 59. When the post-processing is not executed, the sheet that has passed through the conveyance roller pair 53 located on the most downstream side in the sheet conveyance direction among the three conveyance roller pairs 51 to 53 moves in the direction of the arrow A8 along the conveyance path 59 as it is and passes through the opening 506 of the left side wall 502 to be stored in the sheet discharge tray 56.

The sheet discharge tray 56 is configured to be vertically movable along a standing wall 503 erected on a bottom wall 500 in the housing 50, and a lowermost position indicated by a solid line is a home position, and a height position is controlled according to the number of sheets to be stored after image formation. Specifically, in the case of a job of continuously copying a large number of sheets, the sheet discharge tray 56 moves to the uppermost position indicated by a broken line before storing the first sheet and waits for the first sheet to be conveyed, and after storing the first sheet, the sheet discharge tray gradually lowers as the number of sheets to be stored increases, such as the second sheet, the third sheet, and so on. As a result, a newly conveyed sheet is smoothly stored on the sheet bundle stacked and stored on the sheet discharge tray 56.

Meanwhile, when the post-processing is executed, the sheet that has passed through the conveyance roller pair 53 is sent to the sheet alignment part 54.

The sheet alignment part 54 aligns the sheet conveyed onto a tray 101 along a conveyance path 58 indicated by a two-dot chain line. The alignment of the sheets means that the sheets on the tray 101 are aligned in the sheet conveyance direction (arrow A3 direction: referred to as FD direction).

The staple binding part 55 staples a sheet bundle including a plurality of sheets aligned on the tray 101. The sheet bundle after staple binding is conveyed on the tray 101 in the direction of the arrow A4 by a conveying means (not illustrated) and stored in the sheet discharge tray 56.

<Configuration of Sheet Alignment Part 54>

The sheet alignment part 54 includes the tray 101, a paddle part 102, a lifting drive part 103, and a sheet pressing member 104.

The tray 101 is a tray that is disposed below the conveyance roller pair 53 and stores sheets having passed through the conveyance roller pair 53, and has an inclined posture such that a right end part 112 on a side farther from a left end part 111 on a side closer to the sheet discharge tray is lower than a left end part 111 on a side closer to the sheet discharge tray 56.

An upper surface 108 of the tray 101 is a sheet loading surface on which sheets are placed, and the inclination angle θ1 of the sheet loading surface 108 with respect to the horizontal is, for example, 18°. The smaller the inclination angle θ1, the smaller the component of gravity acting on the sheet parallel to the sheet loading surface 108, and the sheet is less likely to slide down on the tray 101 by its own weight. However, the installation space in the vertical direction is reduced accordingly, and downsizing in the vertical direction can be achieved. The inclination angle θ1 can be, for example, in a range of 0° or more and 30° or less. At the right end part 112 of the tray 101, an end guide 105 on which a tip end of the stored sheet abuts is erected.

The sheet pressing member 104 is a thin plate-shaped elastic member, is disposed above the tray 101, and presses the sheet on the tray 101 from above to prevent floating of the sheet.

The paddle part 102 is disposed on the downstream side of the conveyance roller pair 53 in the sheet conveyance direction, and the lifting drive part 103 is disposed close to the paddle part 102.

<Configuration of Paddle Part 102 and Lifting Drive Part 103>

Figure 3:
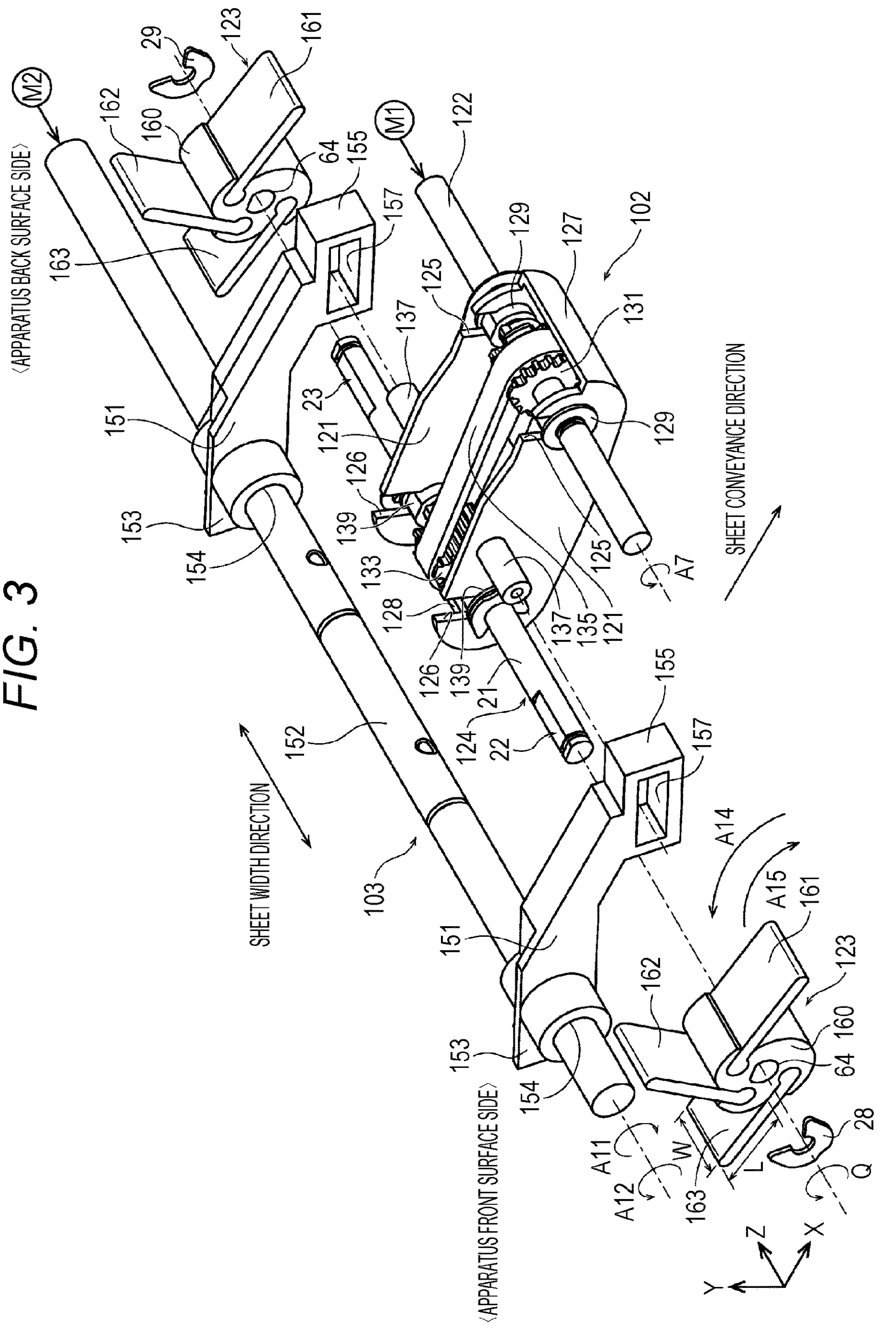
FIG. 3 is an exploded perspective view of a paddle part and a lifting drive part.

FIG. 3 is an exploded perspective view of the paddle part 102 and the lifting drive part 103.

As illustrated in the drawing, the paddle part 102 includes two paddle supporting members 121, a rotation shaft 122, two rotation paddles 123, and a rotation shaft 124.

Each of the paddle supporting members 121 has a plate shape, and end parts on one end side in the sheet conveyance direction are connected to each other by a connecting member 127 and end parts on the other end side are connected to each other by a connecting member 128 in a state where a plate surface is in a posture parallel to an X-Y plane and an interval is provided in the Z-axis direction (apparatus front-rear direction).

In each of the paddle supporting members 121, recesses 125 and 126 with open upper parts are opened at two positions spaced apart in the sheet conveyance direction.

The rotation shaft 122 parallel to the Z-axis direction is rotatably supported in each recess 125 via a bearing 129. Both axial ends of the rotation shaft 122 are rotatably supported by a side wall (not illustrated) of the housing 50. In addition, the rotation shaft 124 parallel to the Z-axis direction is rotatably supported in each recess 126 via a bearing 139.

The rotation paddle 123 is attached to each of both axial ends of the rotation shaft 124 so as to rotate integrally with the rotation shaft 124 one by one. Here, the rotation shaft 124 is a circular shaft part 21 having a circular cross section at the axial central part, and is a D-cut shaft part 22 or 23 in which each of both axial end parts is processed to have a D-shape by cutting a part of the circular cross section.

The two rotation paddles 123 have the same shape and the same size, and have the same sheet alignment function. The two rotation paddles 123 are provided at positions separated by a certain distance in the axial direction of the rotation shaft 124. Specifically, the two rotation paddles 123 are disposed at positions separated by a same constant distance U1 in the axial direction (sheet width direction) from a position U (FIG. 15A) corresponding to a central position in the width direction of the sheet conveyance path 59 (FIG. 2). As a result, the conveying force is applied from each rotation paddle 123 to one sheet S on the tray 101 in a well-balanced manner, and the inclination of the sheet S can be suppressed.

In each of the rotation paddles 123, three fins 161, 162, and 163 are cantilevered by a holder 160.

The holder 160 is a cylindrical member made of resin or metal, and is provided with a through hole 64 through which the rotation shaft 124 is inserted. A D-cut hole part having a shape corresponding to the D-cut shaft part 22 (or 23) of the rotation shaft 124 is provided on the apparatus front surface side of the through hole 64, and a circular hole part having a shape corresponding to the circular shaft part 21 having a circular cross section of the rotation shaft 124 is provided on the apparatus back surface side (not visible in the drawing). The reason why both the D-cut hole part and the circular hole part are provided in one through hole 64 is to prevent reverse attachment at the time of work of attaching each of the two rotation paddles 123 to the rotation shaft 124. The reverse attachment prevention feature will be described later.

Each of the fins 161 to 163 is a plate-like elastic member having flexibility and made of the same shape, the same size, and the same material, for example, rubber, resin, silicon, or the like. The length L of the free end part is, for example, about 17 mm, the width W is, for example, about 13 mm, and the thickness is, for example, about 2.5 mm.

Each of the rotation paddles 123 is fixed to the rotation shaft 124 such that the angle in the rotation direction of the fins 161 to 163 is the same between one rotation paddle and the other rotation paddle. As a result, in each of the rotation paddles 123, two fins having the same reference numeral, for example, the fin 163 of one rotation paddle 123 and the fin 163 of the other rotation paddle 123 rotate in the same phase in the rotation direction. As a result, the timing at which the conveying force is applied from the fins 161 to 163 of the rotation paddle 123 to the sheet on the tray 101 is synchronized between the apparatus front surface side and the apparatus back surface side, so that the difference in the conveying force between the apparatus front and rear is suppressed, and stable sheet conveyance can be obtained.

A toothed pulley 131 is fixed to the rotation shaft 122 at a position between the two bearings 129 and away from each bearing 129, and a toothed pulley 133 is fixed to the rotation shaft 124 at a position between the two bearings 139 and away from each bearing 139. A toothed belt 135 is wound around the two toothed pulleys 131, 133.

Meanwhile, the lifting drive part 103 includes two lever members 151 and a rotation shaft 152 parallel to the Z-axis direction.

A through hole 154 in the Z-axis direction is drilled in a base end part 153 of each lever member 151, and the rotation shaft 152 is fitted into each through hole 154 and fixed to the rotation shaft 152 at a position spaced apart in the Z-axis direction. Each lever member 151 has an arm shape extending in the sheet conveyance direction from the base end part 153, and a long hole 157 penetrating in the Z-axis direction is drilled in the tip end part 155.

A pin 137 protruding from the front surface side surface of the paddle supporting member 121 on the apparatus front surface side enters (engages) the long hole 157 of the lever member 151 on the apparatus front surface side, and the pin 137 protruding from the back surface side surface of the paddle supporting member 121 on the apparatus back surface side enters (engages) the long hole 157 of the lever member 151 on the apparatus back surface side. The width of the long hole 157 is slightly larger than the diameter of the pin 137, and the length of the long hole 157 is several times the diameter of the pin 137.

In such a configuration, when a rotational driving force in the direction of arrow A7 is transmitted from the drive source M1, here, the motor, to the rotation shaft 122 of the paddle part 102, the rotational driving force is transmitted from the rotation shaft 124 to the rotation shaft 124 through the toothed pulley 131, the toothed belt 135, and the toothed pulley 133, and the rotation shaft 124 rotates in the direction of arrow Q. When the rotation shaft 124 rotates, the two rotation paddles 123 integrated with the rotation shaft 124 also rotate in the same direction.

In addition, when a rotational driving force in the direction of the arrow A11 (clockwise direction in the drawing: forward rotation) is transmitted from the drive source M2, here, the motor, to the rotation shaft 152 of the lifting drive part 103, the rotational driving force causes each lever member 151 integrated with the rotation shaft 152 to swing in the same direction around the rotation shaft 152. When the tip end part 155 of each lever member 151 is lowered by this swing, the downward force is transmitted from the tip end part 155 of each lever member 151 to the paddle supporting member 121 through the pin 137 engaged with the long hole 157. This downward force causes the paddle supporting member 121 to swing in the direction of an arrow A14, that is, downward about the rotation shaft 122 while the pin 137 slides in the long hole 157. This swing causes the two rotation paddles 123 to descend.

Conversely, when the rotational driving force in the direction of the arrow A12 (counterclockwise direction in the drawing: reverse rotation) is transmitted from the drive source M2 to the rotation shaft 152, each lever member 151 swings, that is, rises in the same direction about the rotation shaft 152 by the rotational driving force, and the upward force is transmitted to the paddle supporting member 121 through the pin 137 engaged with the long hole 157. By this upward force, the paddle supporting member 121 swings upward in the direction of the arrow Aly about the rotation shaft 122 while the pin 137 slides in the long hole 157 in the direction opposite to the above direction, and the two rotation paddles 123 rise.

The arrangement positions of the long hole 157 of the lever member 151 and the pin 137 of the paddle supporting member 121 engaged therewith are determined in advance such that the pin 137 moves along the long hole 157 as the lever member 151 swings and the paddle supporting member 121 swings by applying a downward or upward force to the paddle supporting member 121 from the swinging lever member 151 through the engagement part between the pin 138 and the long hole 157.

FIG. 2 illustrates a state in which the rotation paddle 123 is located at the home position. In the home position illustrated in the drawing, the rotation paddle 123 and the paddle supporting member 121 are located above the conveyance path 59, and the rotation stop position is controlled such that the three fins 161 to 163 stop at the positions illustrated in the drawing. Therefore, at the home position, the paddle part 102 does not come into contact with the sheet being conveyed, and does not affect the conveyance of the sheet.

Figure 4:
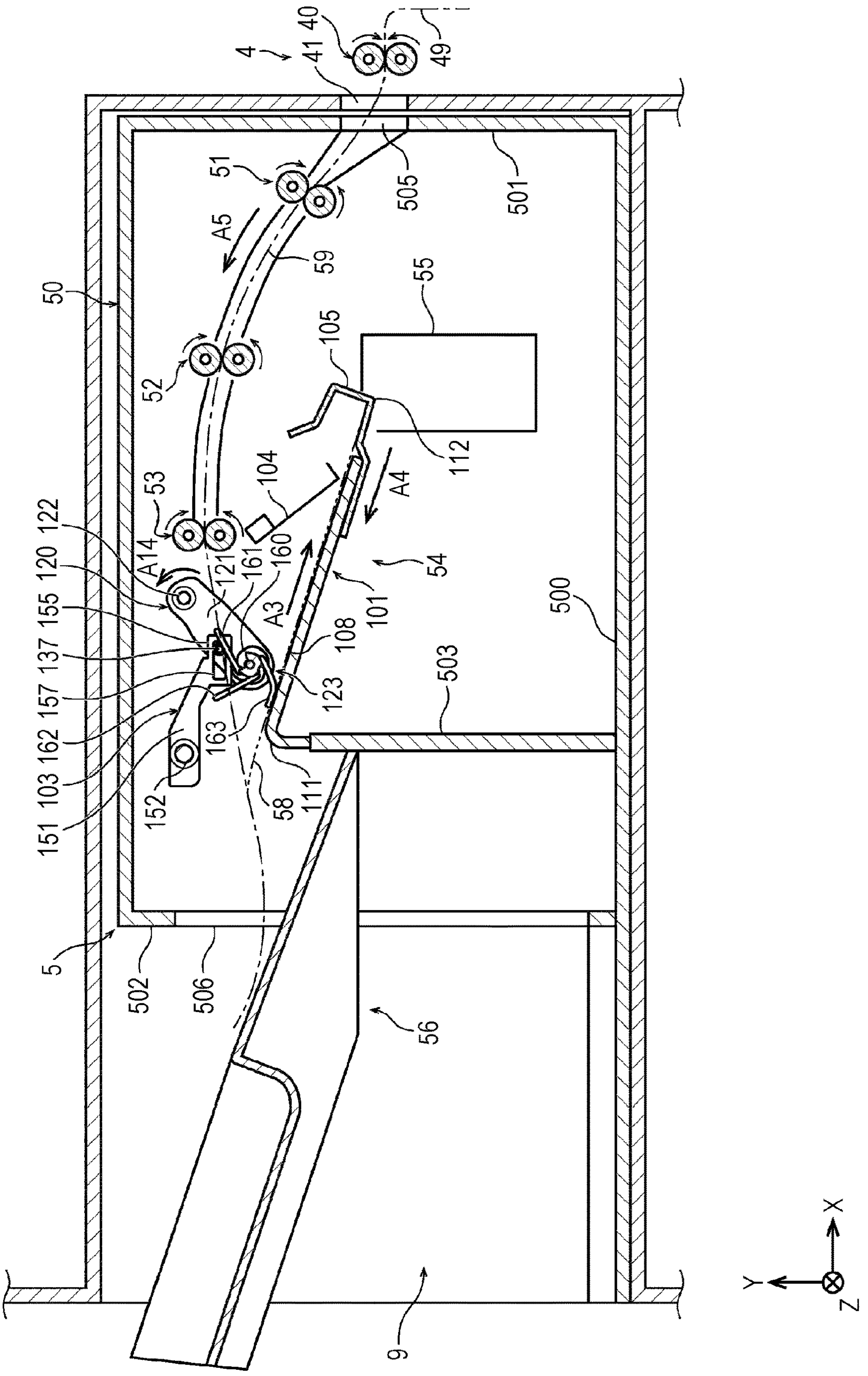
FIG. 4 is a view illustrating a state in which the rotation paddle is lowered from a home position to an abutment position.

Meanwhile, FIG. 4 illustrates a state in which the rotation paddle 123 is lowered from the home position and transitions to an abutment position where the tip end part of the fin 163 crosses the conveyance path 59 and comes into contact with the sheet loading surface 108 of the tray 101 to bend. The control part switches the rotation direction of the driving force of the drive source M2 between the forward rotation direction and the reverse rotation direction to lift or lower the rotation paddle 123.

If no post-processing is performed on the sheet, the rotation paddle 123 remains in its home position. If post-processing is performed on sheets, the rotation paddle 123 moves from the home position to the abutment position, and the sheets on the tray 101 are aligned by the fins 161 to 163 of the rotation paddle 123.

<Sheet Alignment Processing>

Figure 5A:
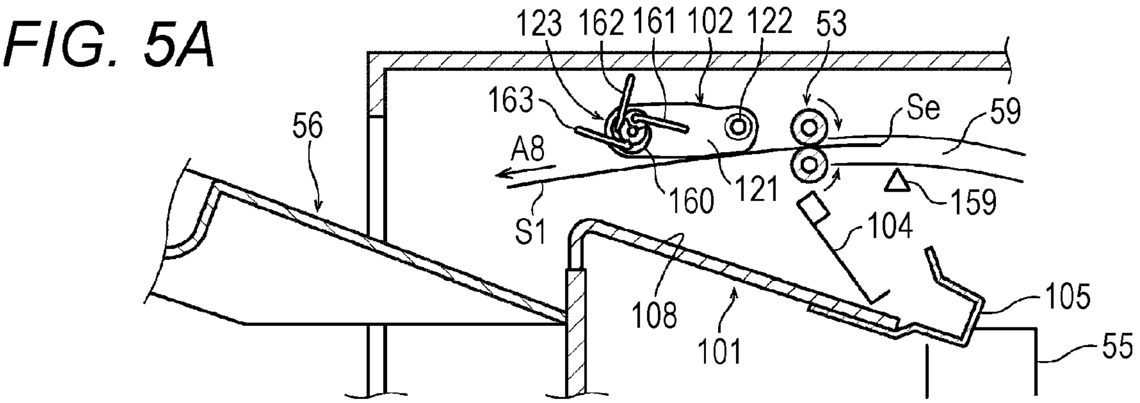
FIG. 5A is a schematic view for describing a state in which one sheet is conveyed to a sheet alignment part when post-processing is executed.

FIGS. 5A to 5D are schematic views for describing a state in which one sheet S is aligned by the sheet alignment part 54 when the post-processing is executed, and the lifting drive part 103 is not illustrated. As illustrated in FIG. 5A, while the first sheet 51 is being conveyed in the direction of the arrow A8 by the conveyance roller pair 53, the rotation paddle 123 is located at the home position, and the rotation paddle 123 is in a stationary state.

Figure 5B:
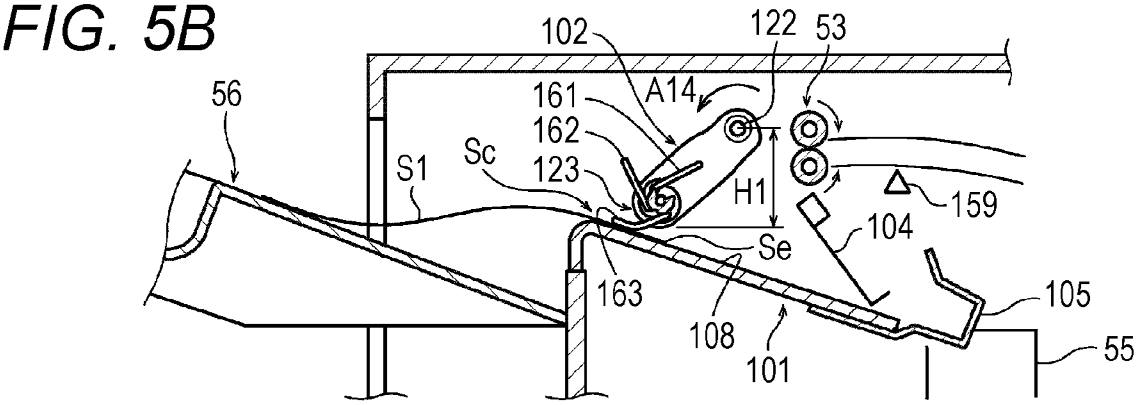
FIG. 5B is a schematic view for describing a state in which the sheet is conveyed onto a tray of the sheet alignment part.

When the rear end Se of the sheet 51 in the conveyance direction passes through the conveyance roller pair 53, the rotation paddle 123 descends from the home position to the abutment position as illustrated in FIG. 5B while the sheet 51 falls by its own weight, and the fin 163 of the rotation paddle 123 presses the rear end side region Sc of the sheet 51 against the sheet loading surface 108 of the tray 101. The falling of the sheet S by its own weight and the pressing by the fin 163 result in conveyance of the sheet 51 to the tray 101. Note that, at this point, the rotation paddle 123 remains stopped, but the rotation is started immediately after the stop.

Here, the movement of the rotation paddle 123 from the home position to the abutment position is started when a predetermined time has elapsed since the conveyance direction rear end Se of the sheet 51 is detected by an optical sensor 159 disposed on the upstream side of the conveyance roller pair 53 in the conveyance direction. This predetermined time is a time required from when the rear end Se of the sheet 51 in the conveyance direction is detected by the optical sensor 159 until the rear end side region Sc of the sheet 51 reaches the position immediately below the rotation paddle 123, and is obtained in advance from the sheet conveying speed (constant) and the distance on the conveyance path 59 from the detection position of the optical sensor 159 to the position immediately below the rotation paddle 123.

Figure 5C:
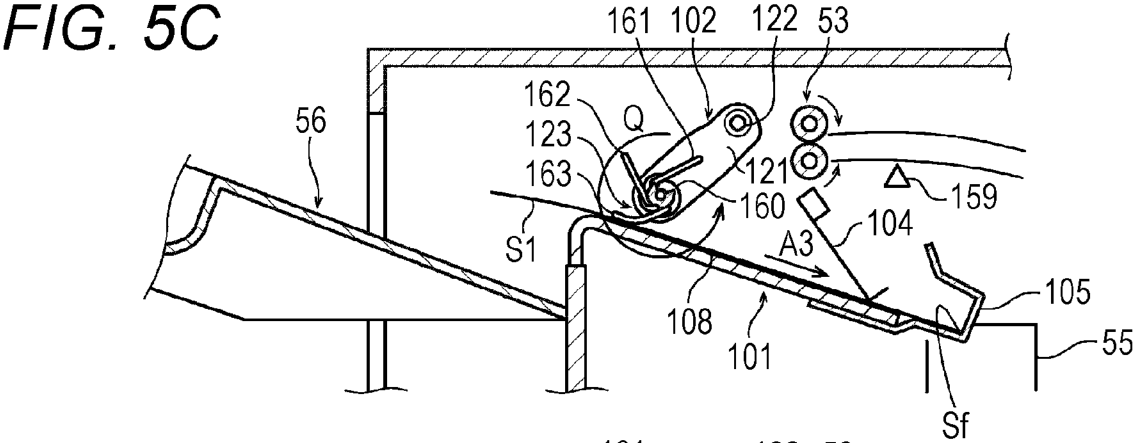
FIG. 5C is a schematic view for describing a state in which the sheet is conveyed on the tray by a rotation paddle.

As illustrated in FIG. 5C, when the rotation of the rotation paddle 123 in the direction of the arrow Q is started, the fins 163, 162, and 161 of the rotation paddle 123 take a posture in which the tip end parts of the fins are bent toward the downstream side in the rotation direction while being in contact with the upper surface of the sheet 51 on the tray 101 in this order, and a frictional force is generated between the tip end parts of the fins and the upper surface of the sheet 51, so that the conveying force along the rotation direction is applied from the rotation paddle 123 to the sheet 51. By applying the conveying force, the sheet 51 is conveyed on the tray 101 in the direction of the arrow A3, and the tip end Sf (corresponding to the rear end Se) of the sheet 51 abuts on the end guide 105 at the right end of the tray 101.

The rotation of the rotation paddle 123 is continued at least for a time assumed to be required for the tip end Sf of the sheet 51 to abut on the end guide 105 from the start of the rotation, and the rotation is stopped when the time elapses. As a result, the alignment of the first sheet 51 on the tray 101 in the direction of the arrow A3 (FD direction) is completed. Note that the rotation of the rotation paddle 123 is stopped by controlling the rotation angle position such that the fins 161 to 163 are in a stationary state in the posture illustrated in FIG. 5A as described above.

The three fins 161 to 163 are spaced apart in the rotation direction and/or the length of the free end part of each fin is determined so that one fin does not contact the other two fins when it is in contact with the sheet S on the tray 101 and is deflected, i.e. each fin does not interfere with each other.

As described in the above section "Summary", in the configuration in which the sheet on the tray is conveyed to the end guide by the rotation paddle 123, when separation of the sheet from the end guide or budding of the sheet occurs, sheet alignment is deteriorated. Therefore, in the present example, the shape of the holder 160 that supports the fins 161 to 163 is devised so as not to cause separation and buckling of the sheets on the tray while using the existing fins. A specific shape of the holder 160 will be described later.

When the alignment of the first sheet S1 is completed, the rotation paddle 123 returns from the abutment position to the home position and waits for the second sheet S to be conveyed. When the second sheet S is conveyed, the rotation paddle 123 descends from the home position to the abutment position, and the fin 163 of the rotation paddle 123 presses the conveyance direction rear end side region Sc of the second sheet S against the sheet S1 stored in the tray 101 (the same movement as in FIGS. 5A to 5B).

Then, when the rotation of the rotation paddle 123 in the direction of the arrow Q is resumed, a force in the rotation direction of each fin is applied to the second sheet S by the fins 163, 162, and 161 of the rotation paddle 123. With this force, the second sheet S stacked on the first sheet S stored on the tray 101 is conveyed in the direction of the arrow A3, and the tip end Sf of the sheet S abuts on the end guide 105 at the right end of the tray 101 (the same movement as in FIG. 5C). Accordingly, the alignment of the second sheet S is completed.

Also for each of the third and subsequent sheets S, a series of operations such as lowering of the rotation paddle 123 from the home position to the abutment position, stopping from the start of rotation, and raising from the abutment position to the home position is repeated one by one, and alignment of each of the sheets S on the tray 101 is executed.

Figure 5D:
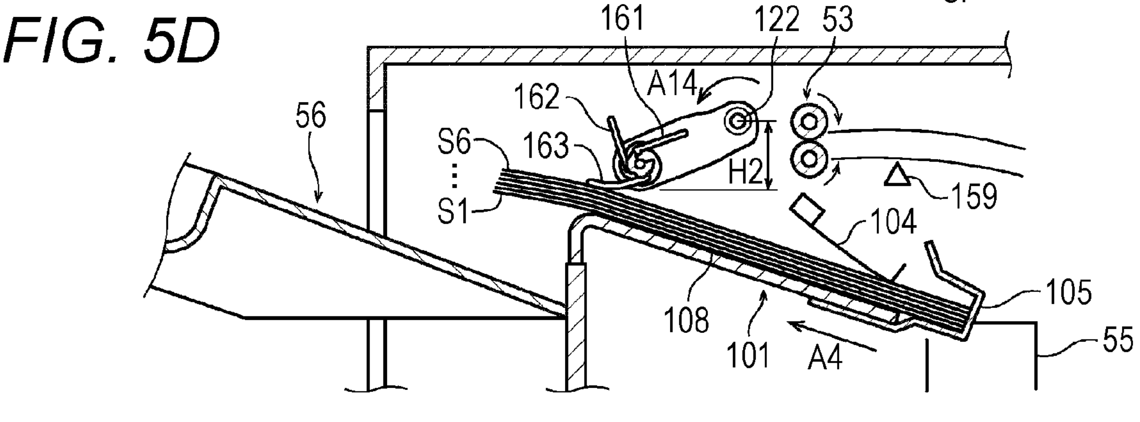
FIG. 5D is a schematic view for describing a state in which a plurality of sheets is stacked and stored on the tray.

FIG. 5D illustrates a state in which the lowering distance H2 of the rotation paddle 123 from the home position with respect to the sixth sheet S6 is shorter than the lowering distance H1 (FIG. 5B) with respect to the first sheet S1 when the six sheets S1 to S6 are stacked and stored on the tray 101.

The lowering distance H of the rotation paddle 123 is changed according to the number of stored sheets for the following reason. That is, as the number of sheets S stacked and stored on the tray 101 increases, the height of the uppermost sheet S from the sheet loading surface 108 of the tray 101 increases. This is because the conveying force applied from each fin 161 to 163 to the uppermost sheet can be equalized even if the number of sheets stored is small or large by shortening the lowering distance H of the rotation paddle 123 as the height increases.

A lowering distance H of the rotation paddle 123 suitable for the number of stored sheets is obtained in advance from an experiment or the like, and a downward swing angle of each lever member 151 driven by the drive source M2 is controlled such that the rotation paddle 123 is lowered by the lowering distance H suitable for the number of stored sheets as the number of stored sheets increases.

<Configuration of Rotation Paddle 123>

Figure 6:
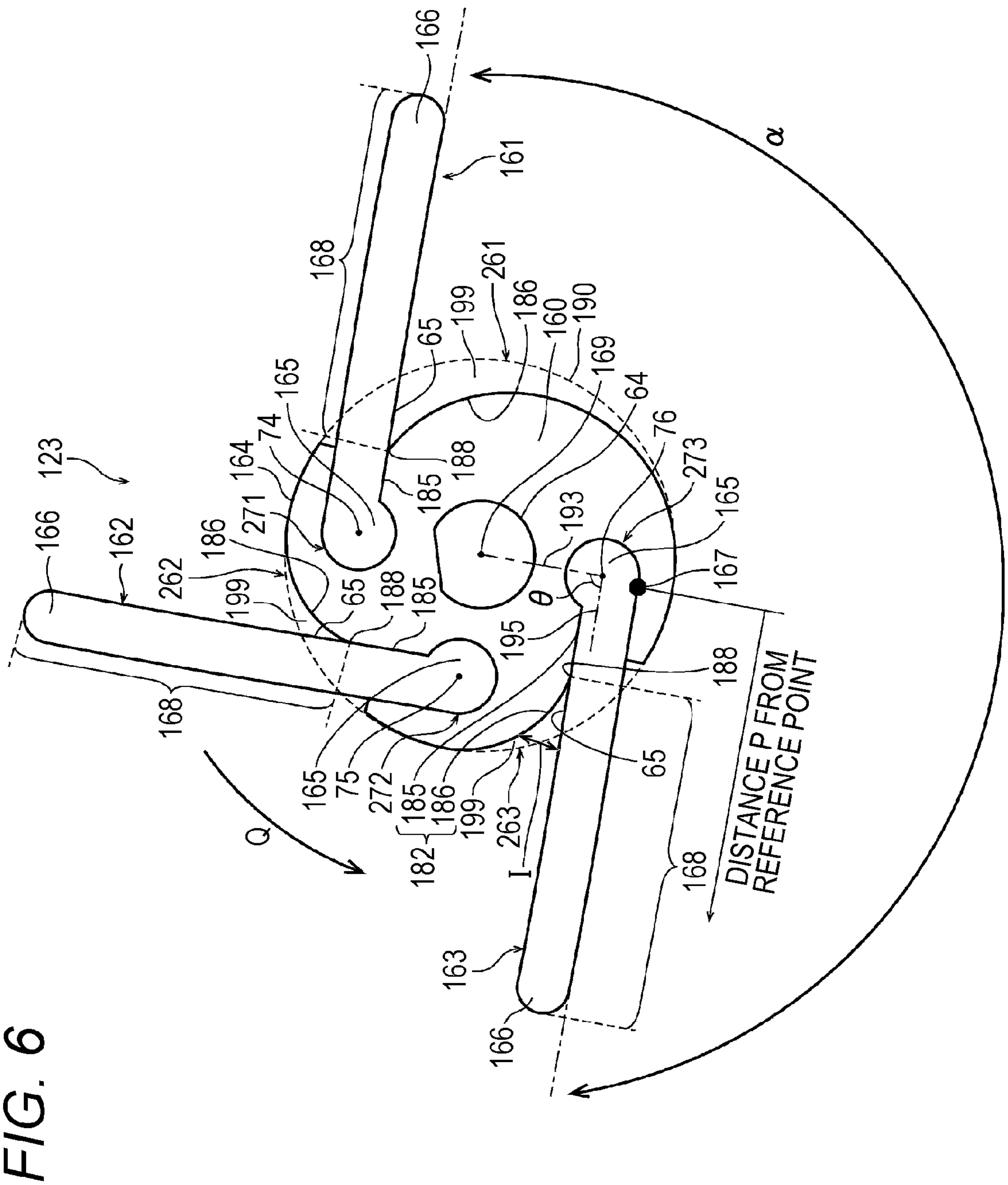
FIG. 6 is an enlarged front view illustrating the configuration of the rotation paddle when viewed from the front in the axial direction.
Figure 7:
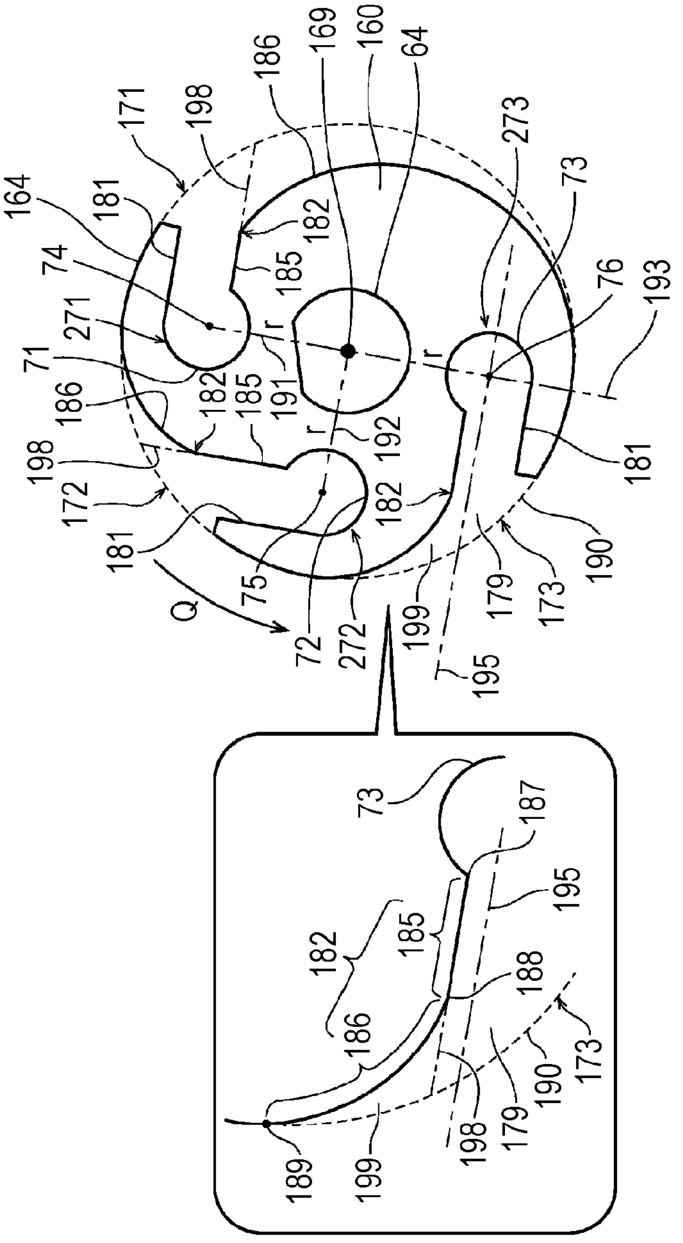
FIG. 7 is a front view illustrating the holder alone before three fins are attached.

FIG. 6 is an enlarged front view illustrating the configuration of the rotation paddle 123 when one rotation paddle 123 is viewed from the front in the axial direction, and FIG. 7 is a front view illustrating the holder 160 alone before the three fins 161 to 163 are attached.

As illustrated in FIGS. 6 and 7, the holder 160 is formed in a shape in which three support recesses 171, 172, and 173 are drilled in an outer peripheral surface 164 of a cylindrical member having a circumference of a circle 190 indicated by a broken line in a front view. This circle 190 is referred to as a circumscribed circle of the holder 160. The center 169 of the circumscribed circle 190 corresponds to the axial center of the rotation shaft 124. Hereinafter, the central axis is referred to as a central axis 169.

The base end parts 165 of the fins 161 to 163 are fixedly supported by bottom parts 271, 272, and 273 of the support recesses 171, 172, and 173 of the holder 160, so that the fins are attached to the holder 160. As illustrated in FIG. 6, in the fin 163, an angle θ formed by a direction rising from the base end part 165 toward the tip end part 166 (a direction parallel to the imaginary straight line 195) and a radial direction (a direction parallel to the imaginary straight line 193 passing through the central axis 169) is about 90°. The same applies to the fins 161 and 162.

Note that no fin is provided in a range a (FIG. 6) from the fin 163 to the fin 161 in the rotation direction Q. This is for the following reason. That is, if the fins are provided in the range a, when the rotation paddle 123 is at the home position (FIG. 5A), the tip ends of the fins cross the conveyance path 59, which may interfere with the conveyance of the sheet S. The range a is a range in which providing the fins within this range might hinder the conveyance of the sheet S being conveyed on the conveyance path 59, and the fins 161 to 163 are provided in a region other than the predetermined range a in one circumference of the outer peripheral surface of the holder 160. In this sense, it can be said that the rotation paddle 123 is stopped at the home position in a posture in which the predetermined range a faces the conveyance path 59. Note that, in a case where there is no possibility of hindrance to the sheet conveyance, fins may be arranged also within the range a.

FIG. 6 illustrates a natural state of the fins 161 to 163, that is, a state in which no external force is applied to the fins 161 to 163. A direction from the base end part 165 toward the tip end part 166 for each fin 161 to 163 is referred to as a fin longitudinal direction. In addition, a part of the free end part 168 of the fin 163 that enters inside the circumscribed circle 190 and is continuous with the base end part 165 is referred to as a base end side part (first part) 65 of the free end part.

Figure 12A:
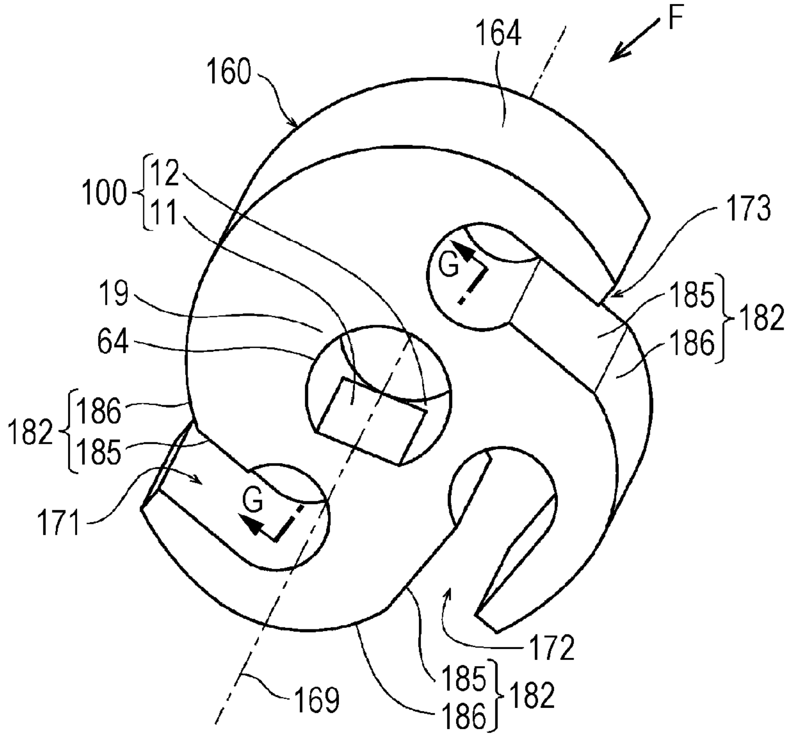
FIG. 12A is a perspective view of a holder.
Figure 12B:
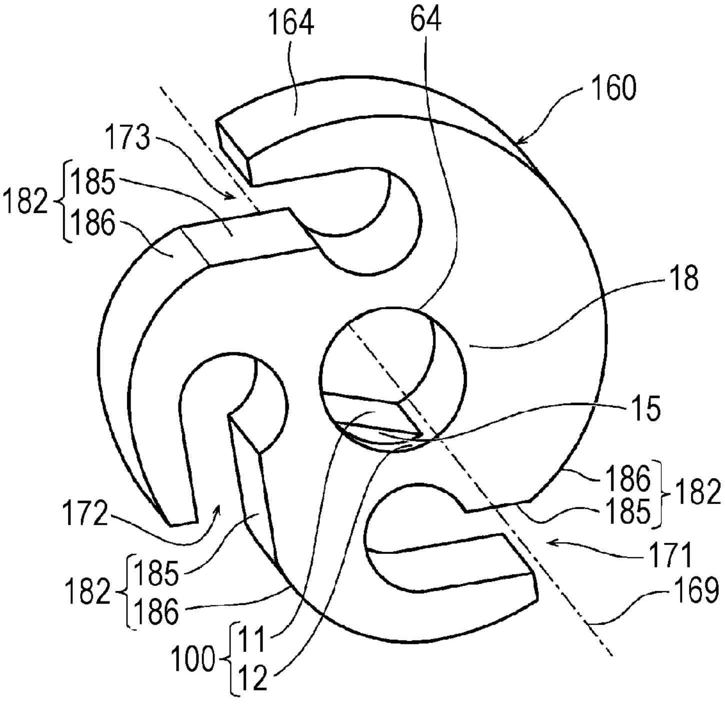
FIG. 12B is a perspective view of the holder as viewed from the direction of the arrow F illustrated in FIG. 12A.

The support recesses 171 to 173 are provided along the axial direction of the central axis 169 over the entire length from one axial end to the other axial end of the holder 160 (FIG. 12A and FIG. 12B). From this, the support recesses 171 to 173 can be said to be axial groove parts formed on the outer peripheral surface 164 of the holder 160.

As illustrated in FIG. 7, the bottom surfaces 71, 72, and 73 of the bottom parts 271, 272, and 273 of the support recesses 171, 172, and 173 have an arc shape in front view, and the centers 74, 75, and 76 of the arcs are located on a circle having a constant radius r from the central axis 169. Here, an angle formed by an imaginary straight line 191 (one-dot chain line) connecting the central axis 169 and the center 74 and an imaginary straight line 192 (one-dot chain line) connecting the central axis 169 and the center 75 is about 90°, and an angle formed by an imaginary straight line 193 (one-dot chain line) connecting the central axis 169 and the center 76 and the imaginary straight line 192 is about 90°.

The support recess 173 has a side wall 181 connected to one circumferential end of the arc-shaped bottom surface 73 in a front view and a side wall 182 connected to the other circumferential end of the bottom surface 73. Since the side walls 181 and 182 have a relationship in which the side wall 182 is located on the upstream side in the rotation direction (direction of arrow Q) of the holder 160 than the side wall 181, the side wall 181 is a side wall on the downstream side in the rotation direction, and the side wall 182 is a side wall on the upstream side in the rotation direction.

When an imaginary straight line (one-dot chain line) passing through the center 76 of the arc of the arc-shaped bottom surface 73 of the support recess 173 and orthogonal to the imaginary straight line 193 in a front view is denoted by reference numeral 195, the side wall 181 on the downstream side in the rotation direction is a side wall extending parallel to the imaginary straight line 195 from one circumferential end of the bottom surface 73.

Meanwhile, the side wall 182 on the upstream side in the rotation direction is a side wall having a first wall surface 185 having a linear shape in a front view and a second wall surface 186 having an arc shape provided on the opening 179 side of the support recess 173 with respect to the first wall surface 185 as illustrated in an enlarged part of the balloon.

In a front view, the first wall surface 185 linearly extends parallel to the imaginary straight line 195 from the other circumferential end 187 of the bottom surface 73, the second wall surface 186 is continuous with the tip end 188 of the first wall surface 185 and extends in an arc shape protruding in a direction approaching the circumscribed circle 190 on the upstream side in the rotation direction of the imaginary extension line 198 (one-dot chain line) of the first wall surface 185, and the tip end (terminal end) 189 of the second wall surface 186 is connected to the circumscribed circle 190. Note that the first wall surface 185 and the second wall surface 186 have a linear shape and an arc shape in a front view, but have the same linear shape and arc shape even when cut along a plane orthogonal to the central axis 169, so that the first wall surface 185 is substantially a flat surface and the second wall surface 186 is an arc surface. Here, when the curvature (=1/radius) of the circumscribed circle 190 is R0 and the curvature of the arc of the second wall surface 186 is R1, a relationship of $R0<R1$ is satisfied.

In the present example, as illustrated in FIG. 6, by providing the second wall surface 186 constituting a recess 263 recessed inward from the circumscribed circle 190 of the holder 160, the space 199 is formed between the second wall surface 186 and the first part 65 of the free end part 168 of the fin 163, and the first part 65 of the fin 163 and the second wall surface 186 of the holder 160 are separated from each other via the space 199 when the fin 163 is in the natural state.

The second wall surface 186 is formed in a shape in which an interval I between the second wall surface 186 and the first part 65 of the fin 163 increases from the base end part 165 toward the tip end part 166 of the fin 163. In other words, the recess 263 formed by the second wall surface 186 is formed in a shape in which the depth at the support position of the base end part 165 of the fin 163 is the deepest and becomes shallower from here toward the upstream side in the rotation direction.

As the rotation paddle 123 rotates and the tip end part 166 of the fin 163 comes into contact with the upper surface of the sheet S on the tray 101 and the free end part 168 of the fin 163 receives a force in the direction opposite to the rotation direction Q and bends to the upstream side in the rotation direction, the fin 163 falls down to the upstream side in the rotation direction with the support position of the base end part 165 as a fulcrum until the first part 65 of the fin comes into contact with the second wall surface 186 of the holder 160 (elastic turning). As the turning amount of the first part 65 of the fin 163 increases, the space 199 becomes narrower, and when the first part 65 of the fin 163 hits the second wall surface 186 of the holder 160 (when the space 199 disappears), the second wall surface 186 restricts further turning of the first part 65 of the fin 163.

In this sense, it can be said that the holder 160 includes the recess 263 (turning allowance recess) formed by recessing the peripheral surface part from the support position (corresponding to the first wall surface 185) of the base end part 165 of the fin 163 to the upstream side in the rotation direction from the circumscribed circle 190, and allows the turning of the fin 163 until the fin comes into contact with the second wall surface 186 (concave surface) when the fin 163 elastically turns while being pressed against the sheet S with the rotation of the rotation paddle 123.

With the configuration of the example in which the space 199 for allowing the first part 65 of the fin 163 to fall is formed as described above, the deflection amount (amount of bending) of the free end part 168 of the fin 163 can be reduced as compared with the configuration of the comparative example in which such a space 199 is not formed. This will be described with reference to FIGS. 8A and 8B.

Figure 8A:
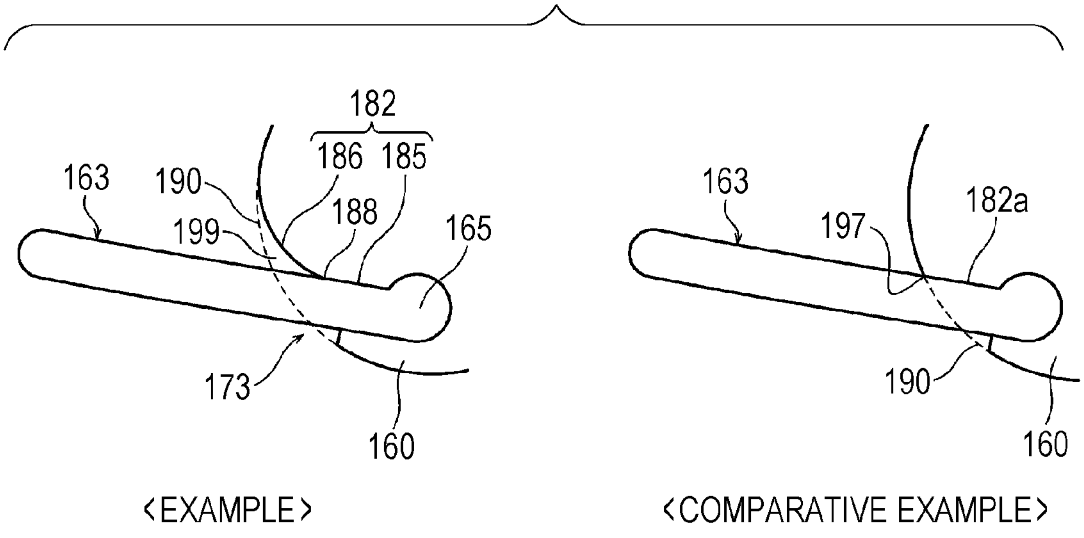
FIG. 8A is a view illustrating a difference in a support configuration of a fin between an example and a comparative example.

FIG. 8A is a diagram illustrating a difference in the support configuration of the fin 163 between the example and the comparative example. In the example illustrated in the drawing, the fin 163 and the support recess 173 of the holder 160 illustrated in FIG. 6 are extracted as they are, and the side wall 182 of the support recess 173 has the first wall surface 185 and the second wall surface 186.

In the comparative example, the side wall 182*a* extends straight to the intersection point 197 with the circumscribed circle 190 in the front view, neither the second wall surface 186 nor the space 199 in the example exists, and the entire side wall 182*a* is in contact with the fin 163. This comparative example corresponds to the configuration illustrated in FIG. 18.

Figure 8B:
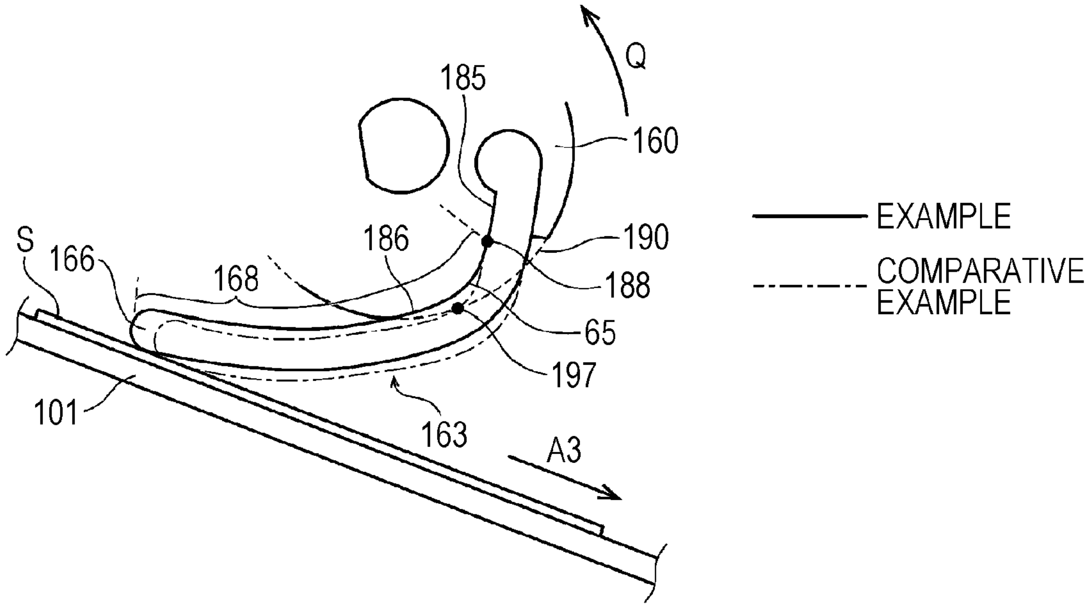
FIG. 8B is a schematic view illustrating a bending posture of the fin when the fin is bent in contact with a sheet on a tray.

FIG. 8B is a schematic view illustrating a bending posture of the fin 163 when the fin 163 is bent in contact with the sheet on the tray 101, in which a solid line indicates the bending posture in the example, and a one-dot chain line indicates the bending posture in the comparative example.

In the example indicated by the solid line, by forming the space 199, the base point (point at which bending starts) of the free end part 168 of the fin 163 in the fin longitudinal direction is the connection point 188 between the first wall surface 185 and the second wall surface 186. Meanwhile, in the comparative example indicated by the broken line, the base point is the intersection point 197 between the side wall 182*a* (FIG. 8A) and the circumscribed circle 190. Since the distance in the fin longitudinal direction from the tip end part 166 of the fin 163 is longer in the base point 188 of the example than in the base point 197 of the comparative example, even if the fin 163 having the same length is used, the deflection amount of the free end part 168 is smaller in the example than in the comparative example, and the manner of bending of the fin 163 is looser.

Figure 18:
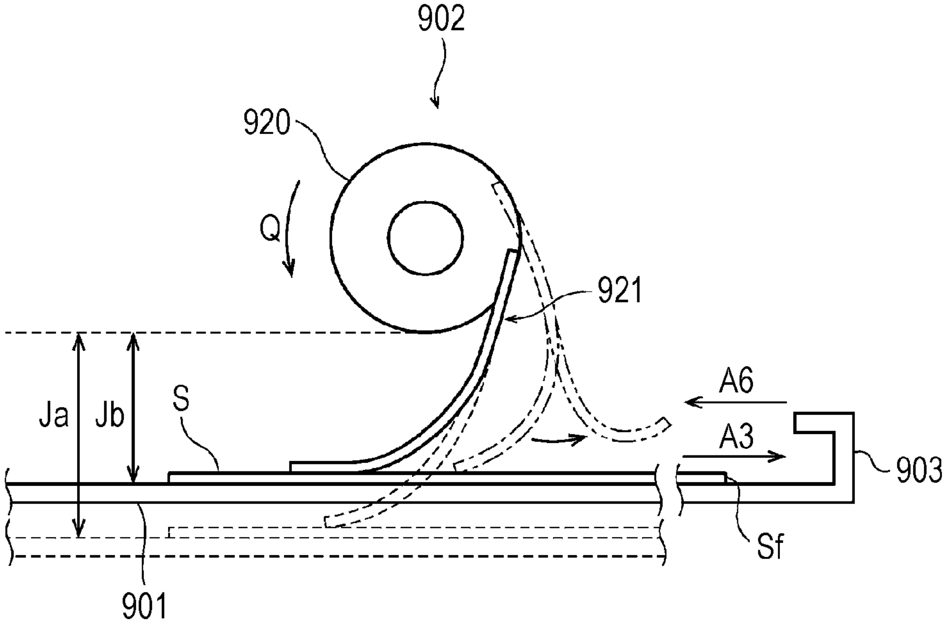
FIG. 18 is a schematic view illustrating an example of a state in which a fin cantilevered by a holder is bent in contact with an upper surface of a sheet on a tray.

When the bending of the free end part 168 becomes loose, the elastic energy accumulated in the bent fin 163 becomes smaller than that in the comparative example in which the bending is tight, and it is suppressed that the fin 163 takes a large jumping posture indicated by a two-dot chain line from a one-dot chain line as illustrated in FIG. 18 at the moment when the fin is separated from the sheet S. As a result, it is possible to prevent the separation of the sheet S from the end guide 105 and the misalignment of the sheet caused by the budding of the sheet S by the way of bending the fin 163 becoming tight.

When the separation distance between the fin 163 and the second wall surface 186 in the natural state, that is, the recessed amount of the second wall surface 186 inward from the circumscribed circle 190 is increased, the deflection amount (amount of bending) of the free end part 168 of the fin 163 can be reduced. Therefore, the magnitude of the recessed amount of the second wall surface 186 can be determined to a value suitable for the apparatus configuration from experiments or the like so that misalignment when the fin 163 moves away from the sheet S can be prevented while ensuring the conveyance of the sheet S to the end guide 105 by the fin 163. In this sense, providing the recess 263 recessed from the circumscribed circle 190 is a measure added to the holder 160 to prevent misalignment.

Although the configuration of the fin 163 and the support recess 173 into which the fin is fitted has been described above, the other fins 162 and 161, the support recesses 172 and 171, and the turning allowance recesses 262 and 261 also basically have the same configuration as the fin 163, the support recess 173, and the turning allowance recess 263.

Specifically, as illustrated in FIG. 7, in a front view, the side wall 182 of each of the support recesses 172 and 171 includes a linear first wall surface 185 and an arc-shaped second wall surface 186, and the second wall surface 186 is extended in an arc shape protruding in a direction approaching the circumscribed circle 190 inside the circumscribed circle 190. In addition, as illustrated in FIG. 6, the holder 160 is formed with turning allowance recesses 262 and 261 formed by recessing peripheral surface parts from the support position of the base end parts 165 of the fins 162 and 161 to the upstream side in the rotation direction from the circumscribed circle 190.

Note that the support recess 172 has the same shape as the support recess 173, but the support recess 171 has a slightly different shape. Specifically, when a length of the first wall surface 185 of the support recess 171 is slightly shorter than a length of the first wall surface 185 of the support recess 173 in a front view, and a curvature of the second wall surface 186 of the support recess 171 is R2, a relationship of $R0<R2<R1$ is satisfied.

The reason why the shape of the support recess 171 is different from that of the support recesses 172 and 173 is as follows.

That is, during one rotation of the holder 160, the fin 163 first contacts the sheet S on the tray 101, then the fin 162, and finally the fin 161.

In the present example, the sheet S on the tray 101 is often conveyed to a position where the tip end Sf of the sheet S abuts on the end guide 105 by the conveying force of the fins 163 and 162 that come in contact with the sheet S first and second. For this reason, the fin 161 that comes in contact with the sheet S last has a strong meaning of correcting the misalignment of the sheet S that has not been completely aligned in the fins 163 and 162 immediately before to further enhance the alignment. In consideration of this point, it is desirable that the conveying force of the sheet S by the fin 161 is slightly weaker than the conveying force of the sheet S by the fins 163 and 162.

The conveying force of the sheet S depends on the pressing force on the sheet S by the fins, and the pressing force decreases as the deflection amount of the fins decreases. The magnitude of the deflection amount of the fins can be adjusted by the magnitude of the recessed amount of the second wall surface 186 inward from the circumscribed circle 190 as described above. Therefore, in the example, the length of the first wall surface 185 is made shorter and the curvature R of the second wall surface 186 is made smaller in the support recess 171 into which the fin 161 is fitted than in the support recesses 173 and 172 into which the fins 163 and 162 are fitted, so that the recessed amount of the second wall surface 186 is increased and the deflection amount of the fin 161 is suppressed.

<Magnitude of Pressing Force by Fin>

Figure 9A:
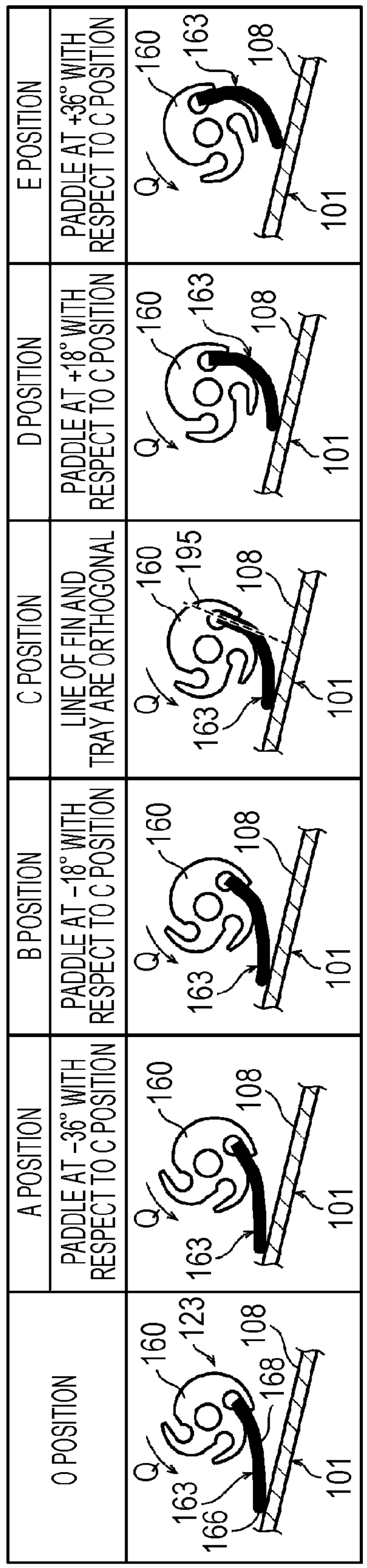
FIG. 9A is a schematic view illustrating a state in which the deflection of the fin changes at each of positions O to E when the rotation paddle is rotated in the example.

FIG. 9A is a schematic view illustrating a state in which one fin 163 starts to bend in contact with the sheet loading surface 108 of the tray 101 from a natural state in which no external force is applied when the rotation paddle 123 in the example is rotated and the bending changes at each of the six rotation angle positions (0, A, B, C, D, and E positions), and only the members necessary for the description are illustrated. Here, the 0 position indicates a position when the fin 163 is in contact with the tray 101. The position C indicates a position where the line of the fin 163 (corresponding to the imaginary straight line 195) is orthogonal to the sheet loading surface 108 of the tray 101. The A (or B) position indicates an angular position of −36° (or)−18° with respect to the C position, that is, a position when the rotation paddle 123 is rotated by an angle of 36° (or 18°) in a direction opposite to the rotation direction (direction of arrow Q) with reference to the C position. Similarly, the D (or E) position indicates a position when the rotation of the rotation paddle 123 is advanced by an angle of 18° (or 36°) in the rotation direction with reference to the C position.

As illustrated in the drawing, when the free end part 168 of the fin 163 comes into contact with the sheet loading surface 108 by the rotation of the rotation paddle 123 and receives a force in a direction opposite to the rotation direction (direction of arrow Q), the free end part 168 of the fin 163 starts to bend so as to have a curved shape convex toward the downstream side in the rotation direction (position O), the deflection amount increases as the rotation angle increases (position A to position E), and eventually the free end part 168 of the fin 163 is separated from the sheet loading surface 108.

Figure 9B:
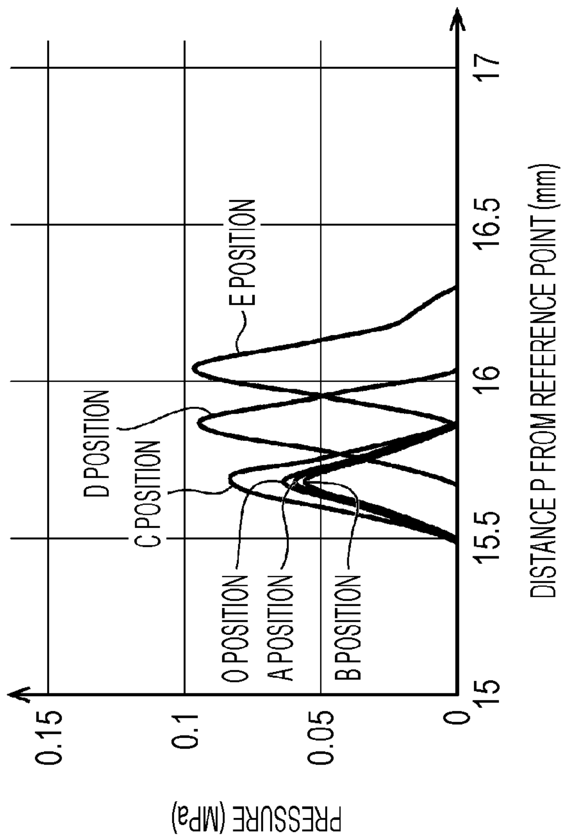
FIG. 9B is a graph illustrating a distribution of pressing forces acting on the tray from the fin at each position in the example.

FIG. 9B is a graph illustrating a distribution of the pressing force acting on the sheet loading surface 108 of the tray 101 from the fin 163 when the rotation paddle 123 is positioned at each of the angular positions O to E in the example. This graph is obtained from an analysis result of simulation by computer aided engineering (CAE).

Here, the "distance P from the reference point" in the drawing indicates a length in a direction from the reference point 167 to the tip end part 166 of the fin 163 illustrated in FIG. 6, and for example, P=16 mm indicates a position separated by 16 mm from the reference point 167.

The reason why each graph of each angular position has a chevron shape is that the tip end part 166 of the fin 163 is not in point contact with the tray 101 but in surface contact at each angular position. The pressing force is the largest (peak) at substantially the center in the fin longitudinal direction of the region in surface contact at each angular position, and the pressing force decreases toward both ends, and the pressing force becomes 0 in the region not in contact.

The magnitude of the distance P at which the pressing force peaks is smallest at the positions O to C, middle at the position D, and largest at the position E. This is considered to be because the bending of the free end part 168 of the fin 163 increases as the position moves to the positions O to E, and the region of the free end part 168 corresponding to the sheet loading surface 108 approaches the tip end in the fin longitudinal direction.

It can be seen that the peak values of the pressing force are substantially the same at the positions D and E, and the magnitude thereof is smaller than 0.1 MPa.

Figure 10A:
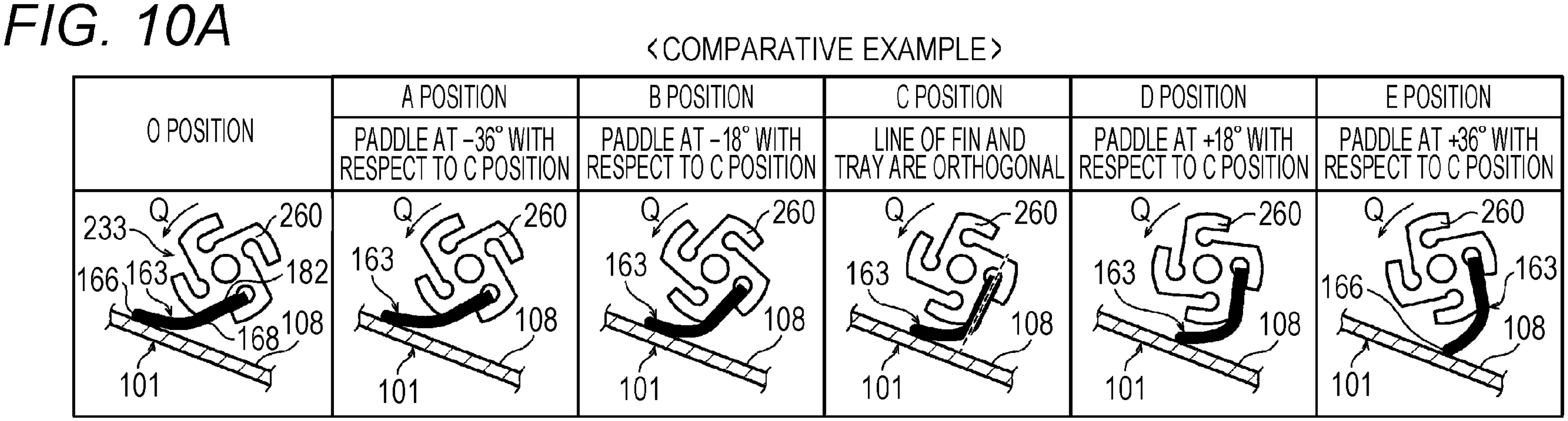
FIG. 10A is a schematic view illustrating a state in which the deflection of the fin changes at each of positions O to E when the rotation paddle is rotated in the comparative example.

Meanwhile, FIG. 10A is a schematic view illustrating a state of bending of the fin 163 at each of the 0 to E positions when a rotation paddle 233 is rotated in the comparative example. In this comparative example, a holder 260 of the rotation paddle 233 has a swirl shape, and the fin 163 is fitted into the recess and is supported in a cantilever manner. However, this configuration is substantially equal to the configuration of the cantilever support illustrated in the comparative example illustrated in FIG. 8A. That is, the entire side wall 182 of the recessed part in the swirl shape illustrated in FIG. 10A is linear in front view, and the second wall surface 186 and the space 199 in the example do not exist.

When the comparative example illustrated in the drawing and the example illustrated in FIG. 9A are compared at the same position, it can be seen that the bending of the fin 163 is tighter in the comparative example than in the example.

Figure 10B:
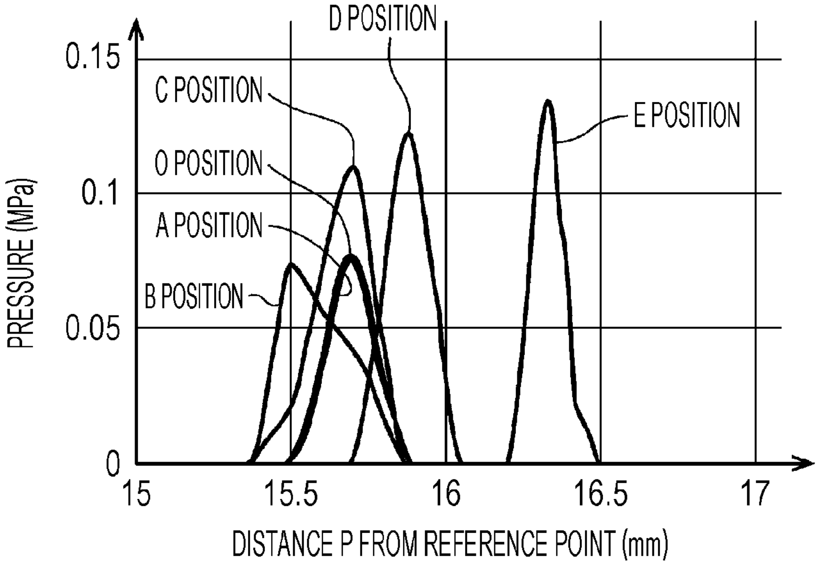
FIG. 10B is a graph illustrating a distribution of pressing forces acting on the tray from the fin at each position in the comparative example.

FIG. 10B is a graph of distribution of pressing forces at respective positions in a comparative example obtained by the same analysis method as in the example illustrated in FIG. 9B. In the comparative example, the peak value of the pressing force is considerably larger than that in the example particularly when the graph at the E position (angular position of +36°) is viewed, specifically, greatly exceeds 0.1 MPa, and the horizontal width of the chevron graph is narrower and the gradient is steeper than those in the example. The position E corresponds to a position immediately before the tip end part 166 of the fin 163 is separated from the sheet loading surface 108. From the graph, it can be said that the force due to the reaction of the pressing force pressing the sheet loading surface 108 of the tray 101 concentrates on a considerably narrow region of the tip end part 166 of the fin 163 at position E.

Since the bending of the fin 163 is tighter in the comparative example than in the example and the force concentrated on the tip end part 166 of the fin 163 is larger, the conveying force applied to the sheet S is larger in the comparative example than in the example at the moment when the tip end part 166 of the fin 163 is separated from the sheet S on the sheet loading surface 108, the large jump of the fin 163 as indicated by the two-dot chain line in FIG. 18 is likely to occur, and the speed of pushing out the sheet S is likely to be faster. This becomes a factor of the above-described deterioration in alignment.

Figure 11:
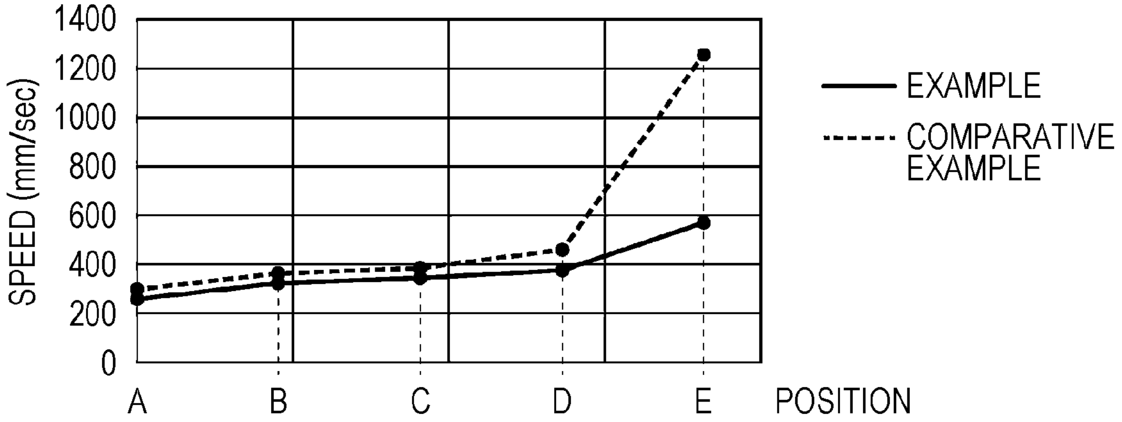
FIG. 11 is a graph illustrating moving speeds of fins at respective positions in the example and the comparative example.

FIG. 11 is a graph illustrating the moving speed of the fin 163 in the abutment region with the sheet loading surface 108 at each position in each of the example and the comparative example obtained by the above analysis.

As illustrated in the drawing, at each position from the position A to the position D, the moving speed is not greatly different between the example and the comparative example, but at the position E, the moving speed of the comparative example is considerably faster than that of the example. This is because in the comparative example, the E position is a position immediately before the free end part 168 of the fin 163 is separated from the sheet loading surface 108, and the abutment region of the fin 163 with the sheet loading surface 108 is considerably closer to the tip end of the fin 163 than in the example, that is, the distance from the central axis 169 (rotation center) is long. Specifically, when the rotational speed of the central axis 169 is constant, the longer the distance from the rotation center to the abutment region, the faster the moving speed (peripheral speed) of the abutment region.

In the example, the position E cannot be said to be a position immediately before the fin 163 is separated from the sheet loading surface 108, but it has been confirmed that the moving speed of the abutment region immediately before the separation is slower than that in the comparative example because the bending of the free end part 168 of the fin 163 is looser than that in the comparative example. This also illustrates that the examples can improve the alignment of the sheet more than the comparative examples.

In this manner, in the configuration in which the rotation paddle 123 is lowered from the home position to the abutment position to align the sheet S on the tray 101, the alignment of the sheet S on the tray 101 can be improved even if the distance between the holder 160 of the rotation paddle 123 and the tray 101 at the abutment position is reduced as compared with the conventional case (the tray 101 is raised upward by the narrowing amount) to downsize the apparatus in the vertical direction.

Note that, in the above example, the configuration example in which the paddle supporting member 121 supporting the rotation paddle 123 is pushed down by the driving force of the motor M2 has been described, but instead of this, for example, a configuration in which the paddle supporting member is dropped only by gravity may be adopted.

In the case of the configuration in which the rotation paddle 123 falls only by gravity, the magnitude (corresponding to pressure illustrated in FIGS. 9B and 10B) of the upward reaction force received from the sheet S when the fin 163 of the rotation paddle that falls by its own weight comes into contact with the sheet S on the tray 101 becomes larger as the bending direction of the fin 163 is tighter. The larger the reaction force, the larger the bouncing of the rotation paddle 123 dropped by its own weight. When the holder 160 slightly rises due to this rebound, the pressing force of the fin 163 to the sheet S on the tray 101 rapidly decreases, and when the conveying force from the fin 163 to the sheet S decreases, the alignment of the sheet S on the tray 101 easily decreases.

As described above, in the example, the fin 163 bends more gently than in the comparative example. For this reason, even in the case of adopting the configuration in which the fin 163 falls only by gravity, as the bending manner of the fin is gentle, the rebound onto the rotation paddle 123 is reduced, and the alignment of the sheet can be improved as compared with the comparative example in which the rebound becomes large.

<Regarding Reverse Attachment Prevention Feature of Rotation Paddle 123 to Rotation Shaft 124>

Figure 13:
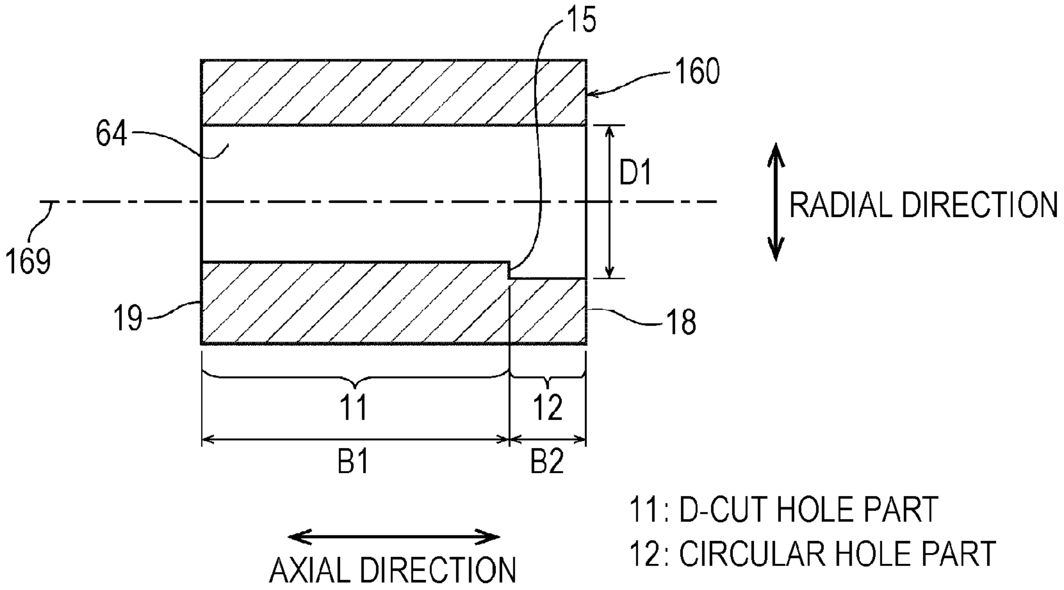
FIG. 13 is a cross-sectional view of the holder taken along an imaginary plane including line G-G illustrated in FIG. 12A and the center line of the holder as viewed in the direction of arrow.

FIG. 12A is a perspective view of the holder 160, and FIG. 12B is a perspective view of the holder 160 as viewed from the direction of the arrow F illustrated in FIG. 12A. FIG. 13 is a cross-sectional view of the holder 160 taken along an imaginary plane including line G-G illustrated in FIG. 12A and the central axis 169 of the holder 160 as viewed in the direction of arrow.

As illustrated in FIGS. 12A and 12B, the through hole 64 of the holder 160 has a D-cut hole part 11 obtained by cutting a part of a circular cross section centered on the central axis 169 and a circular hole part 12 coaxial therewith. The D-cut hole part 11 and the circular hole part 12 constitute a reverse attachment prevention feature 100 in cooperation with the circular shaft part 21 and the D-cut shaft parts 22 and 23 of the rotation shaft 124.

A diameter D1 of the circular hole part 12 illustrated in FIG. 13 is substantially the same as or slightly larger than a diameter of the circular shaft part 21 (FIG. 14) of the rotation shaft 124. When the circular shaft part 21 of the rotation shaft 124 is inserted into the circular hole part 12 of the through hole 64, each tolerance is determined in advance such that rattling hardly occurs. The D-cut hole part 11 is formed by cutting a part of a circular circumference having a diameter D1, and a step 15 is provided in a part continuous with the circular hole part 12. An axial length of the D-cut hole part 11 is B1, and an axial length of the circular hole part 12 is B2 (<B1). The D-cut hole part 11 and the circular hole part 12 correspond to hole parts in which the cross-sectional shape of the through hole 64 is different between the first region and the second region in the axial direction of the rotation shaft 124.

Figure 14:
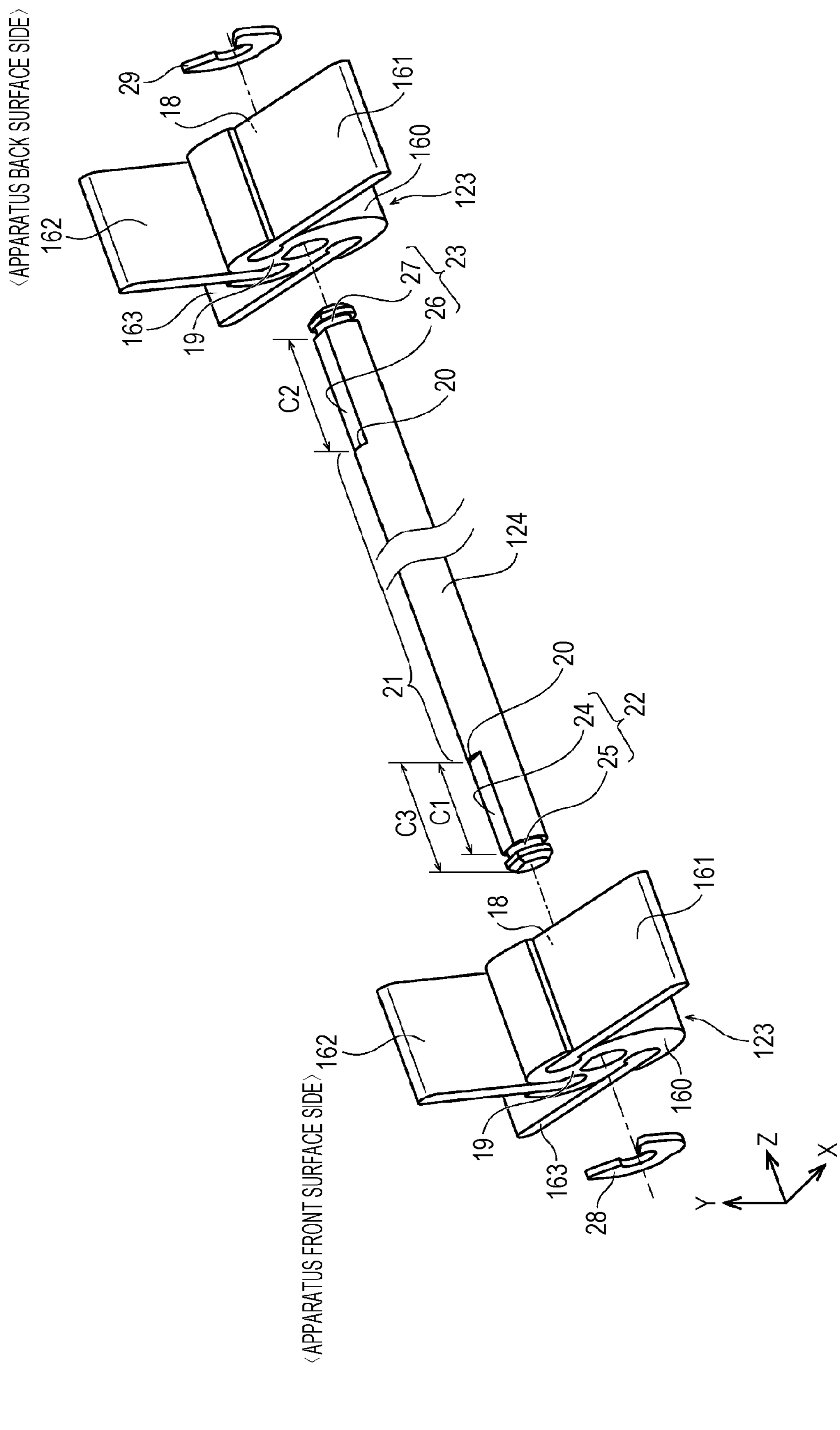
FIG. 14 is an exploded perspective view of two rotation paddles and a rotation shaft.

FIG. 14 is an exploded perspective view of the two rotation paddles 123 and the rotation shaft 124.

As illustrated in the drawing, the rotation shaft 124 has a circular shaft part 21 having a circular cross section at the axial central part, and has D-cut shaft parts 22 and 23 at both axial end parts. A step 20 is provided at a part where the circular shaft part 21 and the D-cut shaft part 22 (or 23) are continuous. The circular shaft part 21 and the D-cut shaft parts 22 and 23 correspond to shaft parts in which the cross-sectional shape of the rotation shaft 124 is different between a central part and an end part in the axial direction.

The D-cut shaft part 22 on the apparatus front surface side is provided with a groove part 25 into which a stop ring 28 is fitted at a tip end part on the apparatus front surface side. In addition, the D-cut shaft part 23 on the apparatus back surface side is provided with a groove part 27 into which a stop ring 29 is fitted at a tip end part on the apparatus back surface side. The entire D-cut shaft part 22 closer to the apparatus back surface side than the groove part 25 is referred to as a shaft body part 24, and the entire D-cut shaft part 23 closer to the apparatus front surface side than the groove part 27 is referred to as a shaft body part 26.

The axial length C1 of the shaft body part 24 is shorter than the axial length C2 of the shaft body part 26. In addition, the length C1 is substantially equal to the length B1, and actually has a dimensional tolerance of about 0 to +1 mm larger than that of B1. Further, the length C2 is substantially equal to the length (B1+B2), and actually has a dimensional tolerance of about 0 to +1 mm larger than (B1+B2). In addition, when the axial length of the D-cut shaft part 22 is C3, a magnitude relationship of length C1<C3<(B1+B2) is established. Due to the magnitude relationship between the respective lengths, it is possible to prevent the rotation paddle 123 from being attached in the reverse direction. This will be described with reference to FIGS. 15A and 15B.

Figure 15A:
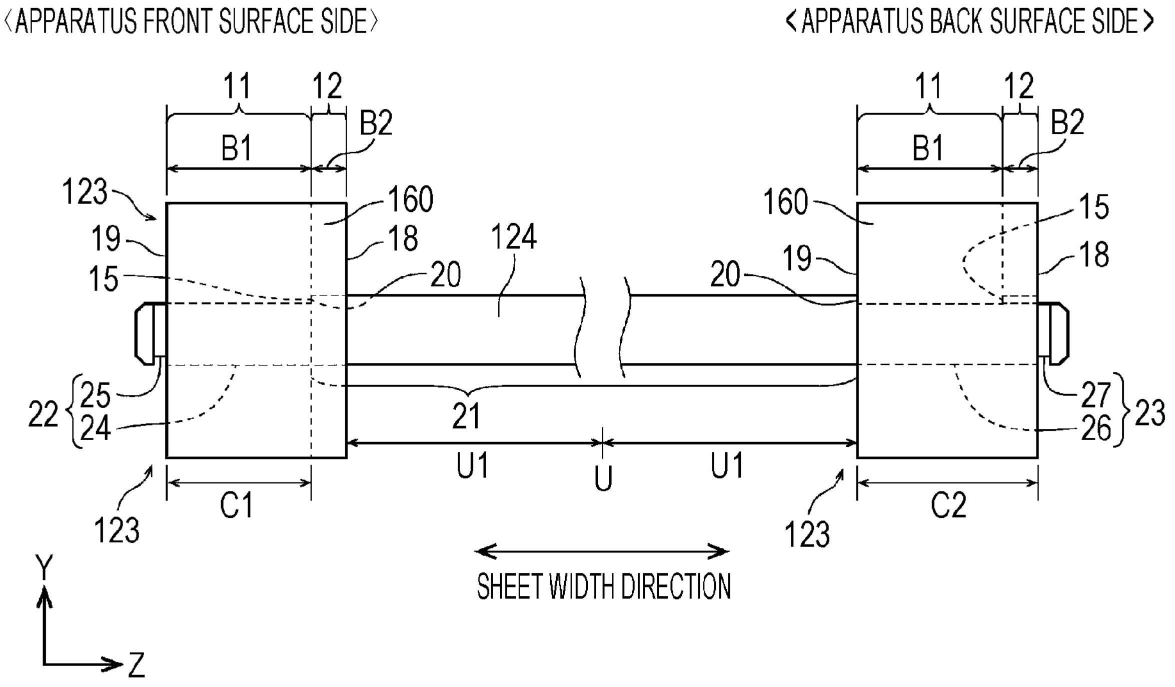
FIG. 15A is a view illustrating an example of a case where two rotation paddles are inserted into a rotation shaft in a correct direction.
Figure 15B:
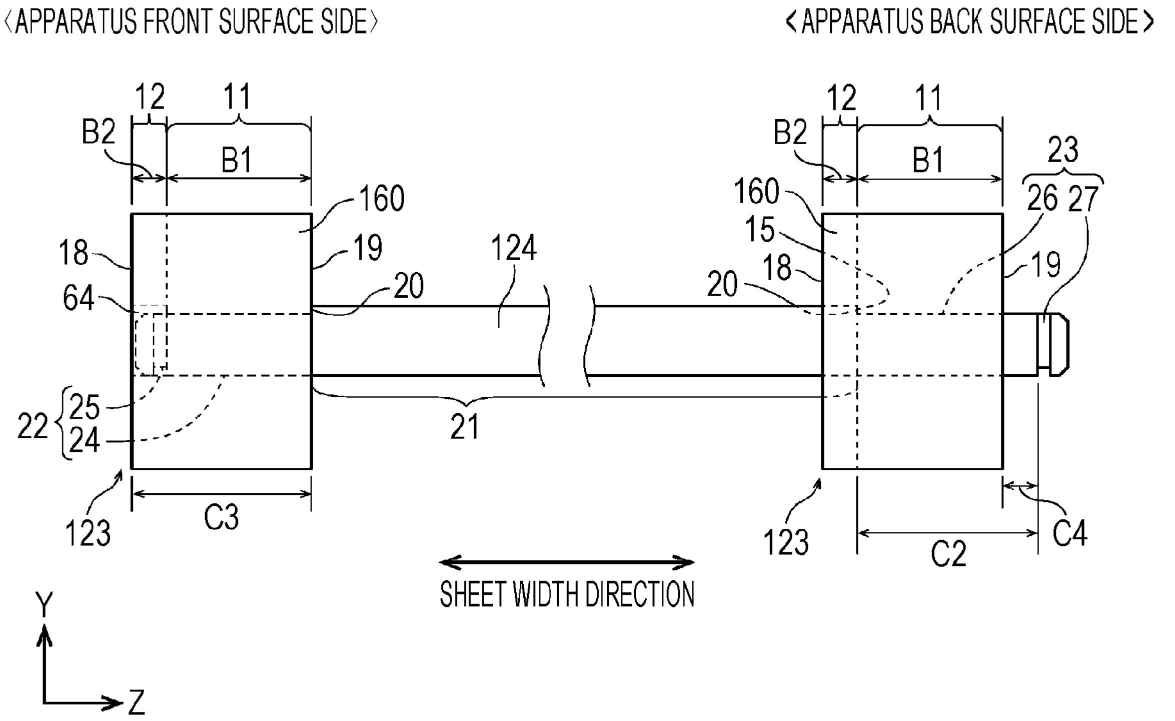
FIG. 15B illustrates an example of a case where two rotation paddles are inserted in a reverse direction.

FIG. 15A illustrates an example of a case where the two rotation paddles 123 are inserted into the rotation shaft in the correct direction, and FIG. 15B illustrates an example of a case where the two rotation paddles 123 are inserted into the rotation shaft 124 in the reverse direction. Note that illustration of the fins 161 to 163 is omitted in each drawing. Here, FIG. 15A illustrates the position U corresponding to the central position (center position) in the width direction of the sheet conveyance path 59, and also illustrates a state in which each rotation paddle 123 is attached at a position separated from the center position U by the same distance U1.

When looking at the rotation paddle 123 on the front surface side of the apparatus illustrated in FIG. 15A, the end part of the circular shaft part 21 of the rotation shaft 124 on the front surface side of the apparatus is fitted into the circular hole part 12 of the holder 160, and the step 15 between the D-cut hole part 11 and the circular hole part 12 of the holder 160 is inserted into the rotation shaft 124 to a position where the step 20 between the circular shaft part 21 and the D-cut shaft part 22 of the rotation shaft 124 abuts on each other, so that no further insertion is possible due to the abutment between the step 15 and the step 20.

Since the length C1 of the shaft body part 24 is substantially the same as the length B1 of the D-cut hole part 11, the groove part 25 of the D-cut shaft part 22 is exposed to the apparatus front surface side from the end surface 19 on the apparatus front surface side of the holder 160, the stop ring 28 can be fitted into the groove part 25, and the rotation paddle 123 on the apparatus front surface side can be correctly attached to the rotation shaft 124.

In addition, when the rotation paddle 123 on the apparatus back surface side is viewed, the rotation paddle 123 is fitted into the rotation shaft 124 until the end surface 19 on the apparatus front surface side of the holder 160 hits the step 20 between the circular shaft part 21 and the D-cut shaft part 23 of the rotation shaft 124. Due to the abutment between the end surface 19 of the holder 160 and the step 20, no further insertion is possible.

Since the length (B1+B2) is substantially the same as the length C2, the groove part 27 of the D-cut shaft part 23 is exposed to the apparatus back surface side from the end surface 18 on the apparatus back surface side of the holder 160, and the stop ring 29 can be fitted into the groove part 27.

As illustrated in FIG. 15A, the axial position of the rotation paddle 123 with respect to the rotation shaft 124 when the rotation paddle 123 is inserted in the correct direction on each of the front surface side and the back surface side of the apparatus is referred to as a normal position.

On the other hand, as illustrated in FIG. 15B, when the rotation paddle 123 is to be fitted to the rotation shaft 124 in the reverse direction from the apparatus front surface side, the rotation paddle can be fitted only until the end surface 19 of the holder 160 on the apparatus back surface side abuts on the step 20 of the rotation shaft 124, that is, the rotation paddle cannot be inserted any more before reaching the normal position.

From the relationship of length C3<(B1+B2), the groove part 25 of the D-cut shaft part 22 is hidden in the through hole 64 of the holder 160, and the stop ring 28 cannot be fitted into the groove part 25. From this, the assembling worker notices that the direction of the rotation paddle 123 is opposite, and can prevent the reverse attachment by attaching in the correct direction.

Similarly, when the rotation paddle 123 is reversely inserted into the rotation shaft 124 from the apparatus back surface side, the end part of the circular shaft part 21 of the rotation shaft 124 on the apparatus back surface side is fitted into the circular hole part 12 of the holder 160, and the insertion is allowed to a position where the step of the holder 160 abuts on the step 20 of the rotation shaft 124. That is, the holder 160 can be inserted to a position beyond the normal position.

From the relationship of the length B1<C2, the axial interval C4 (=C2−B1) between the end surface 19 of the holder 160 on the apparatus back surface side and the groove part 27 of the D-cut shaft part 23 is considerably increased. Although the stop ring 29 can be fitted into the groove part 27 exposed from the end surface 19 of the holder 160, the holder 160 is largely rattled in the axial direction by the interval C4. From this, the worker can notice that the direction of the rotation paddle 123 is opposite and attach the paddle in the correct direction.

By providing such a reverse attachment prevention feature, in a case where the same rotation paddle 123 is used on both the apparatus front surface side and the apparatus back surface side, it is possible to prevent erroneous assembly and secure assembly quality, and further, it is not necessary to manufacture and manage separate rotation paddles 123 on the apparatus front surface side and the apparatus back surface side, so that manufacturing and management costs can be reduced. Note that the rotation paddle 123 on the apparatus front surface side and the rotation paddle 123 on the apparatus back surface side can be separately designed according to the apparatus configuration.

In the above description, the configuration in which the sheet S on the tray 101 is aligned in the FD direction (the direction of the arrow A3 in FIG. 2) has been described, and alignment in the sheet width direction (FIG. 3: hereinafter, referred to as a "CD direction") has not been described. However, a feature part that aligns the sheet S in the CD direction may be provided. The following known configurations can be used for alignment in the CD direction.

That is, two alignment plates movable in the CD direction are arranged on the tray 101, and the two alignment plates are on standby at the standby position where the interval in the CD direction is longer than the width direction length (sheet width) of the conveyed sheet S. When one sheet S conveyed onto the tray 101 is stacked and stored in a state of being sandwiched between two alignment plates, the two alignment plates are moved in a direction approaching from the standby position to the alignment position where the interval between the two alignment plates becomes the same as the length of the sheet width, and then the two alignment plates return to the standby position. The operation of returning the two alignment plates from the standby position to the standby position through the alignment position is repeatedly performed every time one sheet S is conveyed.

Modifications

Although the present disclosure has been described above based on the embodiments, it is needless to say that the present disclosure is not limited to the above-described embodiments, and the following modifications are conceivable.

(1) In the above embodiments, the second wall surface 186 of the holder 160 is an arc surface having the curvature R1 and located inside the circumscribed circle 190, but the present invention is not limited thereto. Each of the fins 161 to 163 may have any shape as long as the shape allows the fin to be tilted until the first part 65 of the fin comes into contact during elastic turning of the fin, and can restrict further tilting when the first part 65 abuts.

Figure 16:
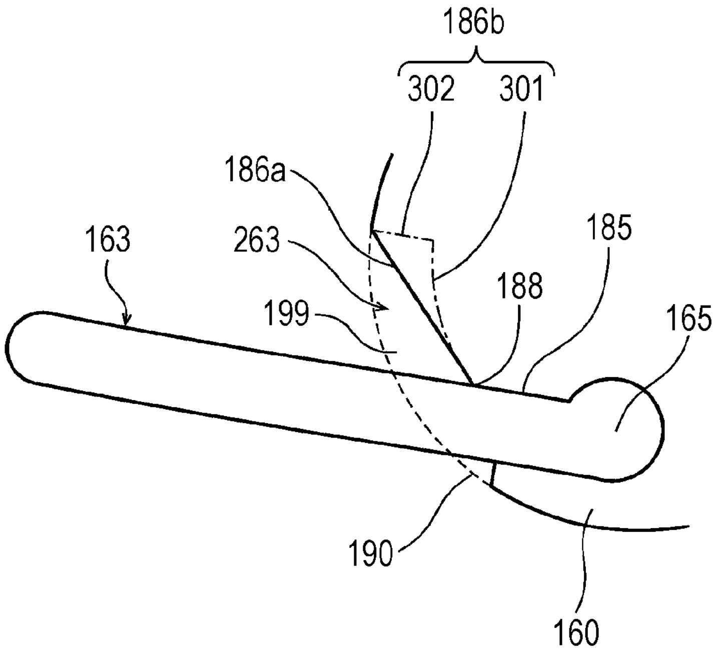
FIG. 16 is a plan view illustrating a shape of a second wall surface of a recess according to a modification.

FIG. 16 is a plan view illustrating a shape of the second wall surface 186 of the recess 263 according to a modification. As illustrated in the drawing, for example, the shape of the second wall surface of the recess 263 may be 186*a* (solid line) or 186*b* (one-dot chain line).

The second wall surface 186*a* has a linear shape (corresponding to a planar shape) in plan view, and the depth of the recess 263 gradually decreases from the downstream side to the upstream side in the rotation direction.

Meanwhile, the second wall surface 186*b* includes an arc part 301 and a straight part 302. The arc part 301 has an arc shape concentric with the circumscribed circle 190, and a radius from the central axis 169 is shorter than that of the circumscribed circle 190. The straight part 302 rises from the upstream edge end in the rotation direction of the arc part 301 toward the circumscribed circle 190 and is connected to the circumscribed circle 190. Since the arc part 301 is concentric with the circumscribed circle 190, the depth of the recess 263 is the same or substantially the same from the upstream side to the downstream side in the rotation direction. In addition, instead of the arc or the straight line, for example, a curve or an arch shape can be used. Furthermore, for example, the shape may be an uneven shape, a pointed ridge shape provided with a plurality of protrusions, or the like.

(2) In the above embodiments, the configuration example in which three fins 161 to 163 are attached to one holder 160 has been described, but the number of fins is not limited thereto. It is sufficient that the alignment of the sheet can be improved, and for example, one or a plurality of fins can be configured according to the apparatus configuration.

In addition, the two rotation paddles 123 are arranged at intervals in the CD direction (sheet width direction), but the present invention is not limited thereto. Depending on the apparatus configuration, for example, a configuration in which three or more rotation paddles 123 are arranged in the CD direction or a configuration in which only one rotation paddle 123 is arranged can be adopted. When only one rotation paddle 123 is provided, the rotation paddle 123 is desirably disposed at a position corresponding to the center position U of the sheet conveyance path 59. The inclination of the sheet S on the tray 101 can be suppressed.

Furthermore, although the two rotation paddles 123 have the same shape and the same size, they may have different shapes and/or sizes as long as alignment can be secured.

(3) In the above embodiments, the configuration example in which the angle θ (FIG. 6) formed by the direction rising from the base end part 165 of the fin 163 toward the opening 179 of the support recess 173 in the natural state and the radial direction is about 90° has been described, but the present invention is not limited thereto. For example, the angle θ may be an angle within a range of 80° or more and 100° or less.

(4) In the above embodiments, the configuration example of the shape in which the holder 160 is formed by boring the support recesses 171 to 173 in the outer peripheral surface 164 of the cylindrical member has been described, but the shape is not limited to the cylindrical shape. For example, it is also possible to adopt a configuration in which a cross section has a square tubular shape such as a regular pentagon.

In this configuration, the support recess 173 is provided on the outer peripheral surface between two corners adjacent in the circumferential direction. The base end part 165 of the fin 163 is fixed and supported by the bottom part 273 of the support recess 173. When a part of the free end part 168 of the fin 163, to which no external force is applied, existing in the support recess 173 is defined as the first part 65, the side wall (second wall surface) 186 on the upstream side in the rotation direction of the support recess 173 is separated from the first part 65 of the fin 163, to which no external force is applied, via the space 199 to the upstream side in the rotation direction, and when the fin 163 elastically turns while being pressed against the sheet S with the rotation of the rotation paddle 123, the turning of the fin 163 is allowed until the first part 65 of the fin 163 comes into contact with the side wall 186 of the support recess 173.

As compared with the configuration in which the first part 65 of the fin 163 is also fixedly supported and the space 199 is not provided (corresponding to the comparative example of FIG. 8A), the bending of the fin 163 that elastically turns is loosened in the same manner as described above by the amount that the elastic turning of the fin 163 is allowed by the space 199, and the excessive conveying force to the sheet S is suppressed.

Figure 17:
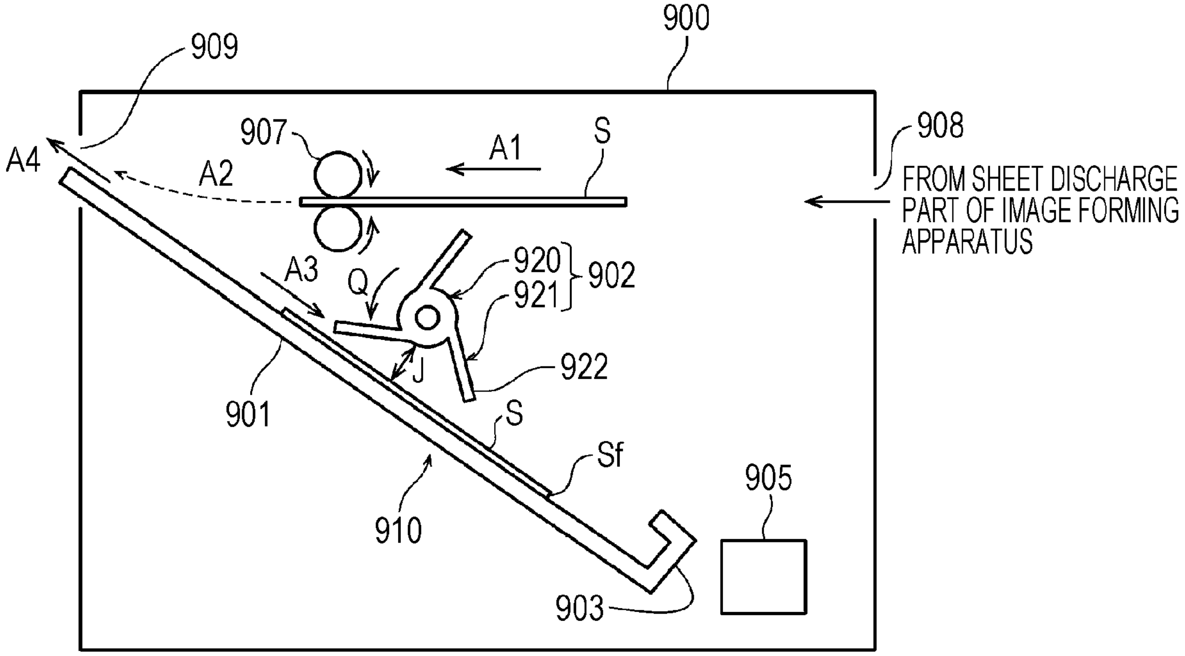
FIG. 17 is a schematic view of a sheet alignment feature in a conventional post-processing apparatus.

(5) In the above embodiments, the configuration example in which the rotation paddle 123 is movable between the home position and the abutment position has been described, but the present invention is not limited thereto. For example, in the same configuration as the arrangement illustrated in FIG. 17, that is, in the configuration in which the rotation paddle 123 is fixedly arranged between the conveyance path 59 and the tray 101, the interval J between the holder 160 of the rotation paddle 123 and the tray 101 can be narrowed while the interval between the conveyance path 59 and the tray 101 is narrowed, and the downsizing of the apparatus in the vertical direction can be achieved.

(6) In the above embodiments, an example in which the post-processing apparatus according to the present disclosure is applied to an apparatus that executes staple binding operation has been described, but the present invention is not limited thereto. As the post-processing, for example, the present invention can be applied to a post-processing apparatus having a function of performing punching processing of forming one or a plurality of punch holes in the sheet, folding processing of folding the aligned sheet bundle in two, three, or the like.

In addition, the post-processing on the sheet S after the image formation is not limited to processing such as staple binding and punching, and for example, processing of aligning a sheet bundle including a plurality of sheets S stacked and stored on the tray 101 can be regarded as the post-processing. The user does not need to perform a troublesome operation of aligning the sheet bundle taken out from the tray 101 with his/her hand.

Further, the configuration example in which the post-processing part 5 is disposed in the in-body space 9 of the image forming apparatus 1 has been described, but the present invention is not limited thereto. For example, the post-processing part 5 (post-processing apparatus) may be attached to the image forming apparatus 1 that is not the in-body sheet discharge type or may be disposed beside the image forming apparatus 1 to perform post-processing on the sheet after image formation.

The shape, dimensions, and material of each member such as the holder, the fin, and the rotation shaft are not limited to those described above, and the shape, dimensions, and the like suitable for the apparatus configuration are determined by experiments and the like.

In addition, the contents of the above embodiments and the above modifications may be combined.

The present disclosure can be widely applied to a post-processing apparatus that performs post-processing such as staple binding on sheets.

Although embodiments of the present invention have been described and illustrated in detail, the disclosed embodiments are made for purposes of illustration and example only and not limitation. The scope of the present invention should be interpreted by terms of the appended claims.

What is claimed is:

1. A post-processing apparatus that rotates a rotation paddle in which a fin having flexibility is cantilevered by a holder to apply a conveying force along a rotation direction to a sheet to align the sheet, wherein the holder includes a recess in which a peripheral surface part from a support position of the fin to an upstream side in the rotation direction is recessed from a circumscribed circle of the holder, and when the fin elastically turns while being pressed against the sheet with rotation of the rotation paddle, turning of the fin is allowed until the fin comes into contact with a surface of the recess.

2. The post-processing apparatus according to claim 1, wherein the recess is formed in a shape in which a depth at the support position of the fin is deepest and becomes shallower from here toward the upstream side in the rotation direction.

3. The post-processing apparatus according to claim 2, wherein the surface of the recess with which the fin is in contact is a curve or a straight line when viewed from a rotation axis direction.

4. The post-processing apparatus according to claim 3, wherein the curve is an arc that protrudes in a direction approaching the circumscribed circle.

5. The post-processing apparatus according to claim 4, wherein a curvature R1 of the arc is larger than a curvature R0 of the circumscribed circle.

6. The post-processing apparatus according to claim 1, wherein when the fin is defined as a first fin, the holder further supports a second fin in a cantilever manner at a position separated from the first fin in the rotation direction, and the holder is provided with a same recess corresponding to the second fin as the recess corresponding to the first fin.

7. The post-processing apparatus according to claim 6, wherein the first fin and the second fin have a positional relationship in which one fin of the first fin and the second fin does not interfere with another fin of the first fin and the second fin when the one fin falls down in contact with the sheet.

8. The post-processing apparatus according to claim 6, further comprising a tray on which a sheet is placed, wherein the sheet being conveyed on a conveyance path above the tray falls and is placed on the tray, the rotation paddle is movable between a home position above the conveyance path and an abutment position that is lowered from the home position and is in contact with the sheet on the tray, the first fin and the second fin are provided in a region other than a predetermined range in one circumference of an outer peripheral surface of the holder, and the rotation paddle is stopped at the home position in a posture where the predetermined range faces the conveyance path.

9. The post-processing apparatus according to claim 1, wherein when the rotation paddle is defined as a first rotation paddle, a second rotation paddle having a same sheet alignment function as the first rotation paddle is provided at a position away from the first rotation paddle by a certain distance in an axial direction of a rotation shaft.

10. The post-processing apparatus according to claim 9, wherein in the first rotation paddle and the second rotation paddle, the fin of the first rotation paddle and the fin of the second rotation paddle rotate in a same phase in the rotation direction.

11. The post-processing apparatus according to claim 9, wherein each of the holder of the first rotation paddle and the holder of the second rotation paddle has a through hole through which the rotation shaft is inserted, the post-processing apparatus further comprising a reverse attachment prevention feature that prevents attachment of the first rotation paddle and the second rotation paddle in a reverse direction with respect to a rotation axis.

12. The post-processing apparatus according to claim 11, wherein the holder of the first rotation paddle and the holder of the second rotation paddle have a same shape, and the reverse attachment prevention feature includes a configuration where a cross-sectional shape of the through hole is different between a first region and a second region in the axial direction of the rotation shaft, and a cross-sectional shape of the rotation shaft is different between a central part and an end part in the axial direction, such that for both the first rotation paddle and the second rotation paddle, when inserted to a normal position in the axial direction in a correct direction, further insertion cannot be performed, and when inserted in a reverse direction, insertion cannot be performed before reaching the normal position, or insertion can be performed to a position beyond the normal position.

13. The post-processing apparatus according to claim 1, further comprising a tray on which a sheet is placed, wherein a sheet loading surface of the tray has an inclination angle of 0° or more and 30° or less with respect to horizontal when an upstream side in a sheet conveyance direction is an upper side and a downstream side is a lower side.

14. The post-processing apparatus according to claim 1, wherein staple binding processing of binding a plurality of sheets or punching processing of forming punch holes in the sheets is performed as post-processing on the sheets aligned.

15. An image forming apparatus comprising: an image forming part that forms an image on a sheet and discharges the sheet on which the image is formed; and a post-processing part that stores and aligns the sheet discharged on a tray, the image forming apparatus comprising the post-processing apparatus according to claim 1 as the post-processing part.

16. The image forming apparatus according to claim 15, further comprising an image reading part that reads a document image, wherein an in-body space is interposed between the image reading part and the image forming part located below the image reading part, and the post-processing part is accommodated in the in-body space.

17. A post-processing apparatus that rotates a rotation paddle in which a fin having flexibility is cantilevered by a holder to apply a conveying force along a rotation direction to a sheet to align the sheet, wherein a support recess that fixedly supports a base end part of the fin at a bottom part is provided on an outer peripheral surface of the holder, and when a part of a free end part of the fin existing in the support recess is defined as a first part, a side wall on an upstream side in the rotation direction of the support recess is separated from the first part of the fin to which no external force is applied to the upstream side in the rotation direction through a space, and when the fin elastically turns while being pressed against the sheet with rotation of the rotation paddle, turning of the fin is allowed until the first part of the fin comes into contact with the side wall of the support recess.

18. An image forming apparatus comprising: an image forming part that forms an image on a sheet and discharges the sheet on which the image is formed; and a post-processing part that stores and aligns the sheet discharged on a tray, the image forming apparatus comprising the post-processing apparatus according to claim 17 as the post-processing part.

19. A rotation paddle that is used in a post-processing apparatus that aligns a sheet and applies a conveying force along a rotation direction to the sheet, the rotation paddle comprising:

a fin having flexibility; and a holder that supports the fin in a cantilever manner, wherein the holder includes a recess in which a peripheral surface part from a support position of the fin to an upstream side in the rotation direction is recessed from a circumscribed circle of the holder, and when the fin elastically turns while being pressed against the sheet with rotation of the rotation paddle, turning of the fin is allowed until the fin comes into contact with a surface of the recess.

* * * * *